US012591692B2

(12) United States Patent　　　　(10) Patent No.: US 12,591,692 B2
Bridges et al.　　　　　　　　　　　 (45) Date of Patent: Mar. 31, 2026

(54) METHODS FOR SECURING DATA

(71) Applicant: PaperClip Inc., Hackensack, NJ (US)

(72) Inventors: David M. Bridges, Toms River, NJ
(US); Ezekiel Kruglick, Poway, CA
(US); Mitchell Mond, East Brunswick,
NJ (US); Alex Devia, Live Oak, TX
(US); Balram Singh, Manalapan, NJ
(US); Timothy Werner Regewitz,
Dunellen, NJ (US)

(73) Assignee: PAPERCLIP, INC., Hackensack, NJ
(US)

( * ) Notice: Subject to any disclaimer, the term of this
patent is extended or adjusted under 35
U.S.C. 154(b) by 347 days.

(21) Appl. No.: 17/966,268

(22) Filed: Oct. 14, 2022

(65) Prior Publication Data

US 2023/0205896 A1　　Jun. 29, 2023

Related U.S. Application Data

(60) Provisional application No. 63/284,833, filed on Dec.
1, 2021, provisional application No. 63/255,738, filed
on Oct. 14, 2021.

(51) Int. Cl.
*G06F 21/60*　　　(2013.01)
*G06F 16/22*　　　(2019.01)
*G06F 16/903*　　 (2019.01)
*G06F 21/55*　　　(2013.01)
*G06F 21/62*　　　(2013.01)
(52) U.S. Cl.
CPC .......... *G06F 21/602* (2013.01); *G06F 16/221*
(2019.01); *G06F 16/90344* (2019.01); *G06F*

*21/554* (2013.01); *G06F 21/6218* (2013.01);
*G06F 2221/034* (2013.01)
(58) Field of Classification Search
CPC ................. G06F 21/602; G06F 16/221; G06F
16/90344; G06F 21/554; G06F 21/6218;
G06F 2221/034
See application file for complete search history.

(56) References Cited

U.S. PATENT DOCUMENTS

| | | | |
|---|---|---|---|
| 12,045,364 B1 * | 7/2024 | Trepetin .............. | H04L 63/0428 |
| 2014/0164774 A1 * | 6/2014 | Nord ..................... | H04L 9/0861 |
| | | | 713/171 |
| 2015/0039912 A1 | 2/2015 | Payton et al. | |

(Continued)

FOREIGN PATENT DOCUMENTS

| WO | 2018/039481 A1 | 1/2018 |
|---|---|---|
| WO | 2019/136438 A1 | 7/2019 |

OTHER PUBLICATIONS

Seny Kamara, Dynamic Searchable Symmetric Encryption, 2012
(Year: 2012).*

(Continued)

*Primary Examiner* — Linglan Edwards
*Assistant Examiner* — Jacob Benedict Knackstedt
(74) *Attorney, Agent, or Firm* — Ruggiero McAllister &
McMahon LLC

(57)　　　　ABSTRACT

A method for securely processing data is provided. The
method allows for processing data out of context to assure
security and can use a combination of multiple encryptions,
hashing techniques, homomorphic searching, two or more
key owners and threat detection and response to further
enhance the security of the data.

3 Claims, 18 Drawing Sheets

Tenant Keyword Table Search

(56) References Cited

U.S. PATENT DOCUMENTS

| | | | |
|---|---|---|---|
| 2017/0061151 A1 | 3/2017 | Baessler et al. | |
| 2018/0084008 A1* | 3/2018 | Turuvekere Nataraja | H04L 63/08 |
| 2018/0157703 A1* | 6/2018 | Wang | G06F 16/2453 |
| 2018/0260469 A1 | 9/2018 | Paris et al. | |
| 2020/0202036 A1* | 6/2020 | Baruch | H04L 63/101 |
| 2020/0228322 A1 | 7/2020 | Bridges et al. | |
| 2020/0382488 A1* | 12/2020 | Liu | H04L 67/568 |
| 2021/0042305 A1 | 2/2021 | Barnes, II | |
| 2021/0365413 A1* | 11/2021 | Shilane | G06F 18/22 |
| 2022/0156303 A1* | 5/2022 | De Sousa Webber | G06F 16/35 |
| 2022/0222366 A1* | 7/2022 | Nagaraja | G06F 21/6218 |
| 2024/0372562 A1* | 11/2024 | Cooper | H03M 7/3059 |

OTHER PUBLICATIONS

International Preliminary Report on Patentability dated Apr. 25, 2024 from corresponding International Patent Application No. PCT/US2022/046715, 8 pages.

International Search Report and Written Opinion dated Mar. 29, 2023 from corresponding International Patent Application No. PCT/US2022/046715, 11 pages.

Ahmadian et al.; "SecureNoSQL: An approach for secure search of encrypted NoSQL databases in the public cloud", International Journal of Information Management 37.2, 2017, pp. 63-74. Retrieved on Mar. 7, 2023 from <https://www.sciencedirect.com/science/article/abs/pii/S0268401216302262> entire document.

Brown University; "How to Search on Encrypted Data: Searchable Symmetric Encryption (Part 5)", Encrypted Systems Lab. Aug. 2014, Retrieved on Mar. 7, 2023 from <https://esl.cs.brown.edu/blog/how-to-search-on-encrypted-data-searchable-symmetric-encrypted-data-searchable-symmetric-encryption-part-5/> entire document.

Partial European Search Report dated Aug. 8, 2025 from corresponding European Patent Application No. 22881834.0, 13 pages.

Gan Qingqing et al: "Dynamic Searchable 1-12 Symmetric Encryption with Forward and Backward Privacy: A Survey", Dec. 10, 2019 (Dec. 10, 2019), pp. 37-52, XP047532092, [retrieved on Dec. 10, 2019].

Leontiadis et al.; "Storage 1-12 Efficient Substring Searchable Symmetric Encryption", IACR, International Association for Cryptologic Research, vol. 20170628:221707, Jun. 29, 2017, pp. 1-23, XP061023751, Retrieved from the Internet: URL:http://eprint.iacr.org/2017/153.pdf [retrieved on Jun. 29, 2017].

Mexico First Examination Search Report dated Sep. 30, 2025 from corresponding Mexican Patent Application No. 202417030101, 7 pages.

* cited by examiner

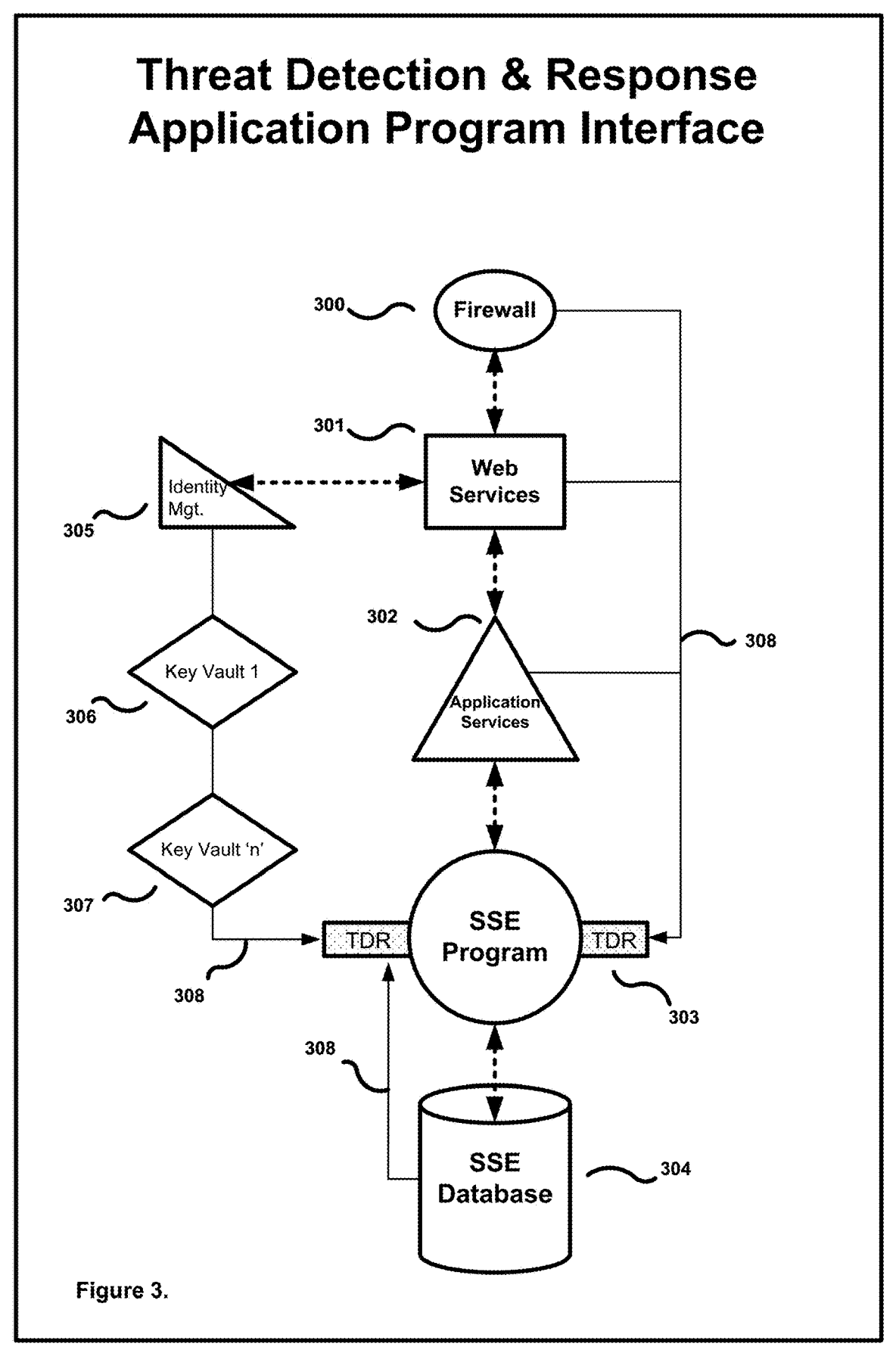

Threat Detection & Response Application Program Interface

300 — Firewall

301 — Web Services

305 — Identity Mgt.

302 — Application Services

306 — Key Vault 1

307 — Key Vault 'n'

308

TDR   SSE Program   TDR

303

308

308 — SSE Database — 304

Figure 3.

Threat Detection Telemetry

Tenant Keyword Table - Create

Example SSE Partial Searching

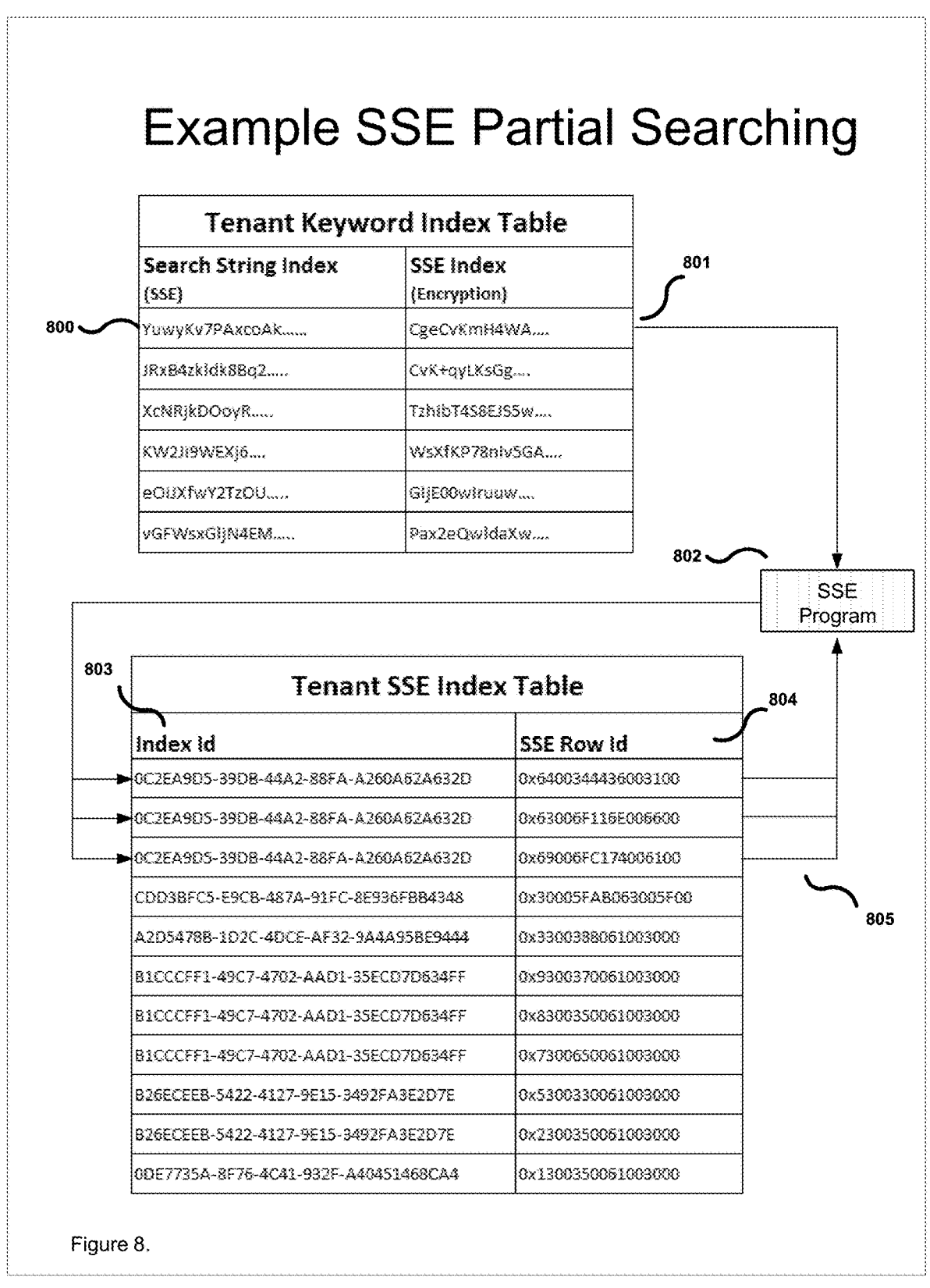

Tenant Keyword Index Table

| Search String Index (SSE) | SSE Index (Encryption) |
|---|---|
| YuwyKv7PAxcoAK...... | CgeCvKmH4WA.... |
| JRxB4zkIdk8Bq2..... | CvK+qyLKsGg.... |
| XcNRjkDOoyR..... | TzhibT4S8EJS5w.... |
| KW2Ji9WEXj6.... | WsXfKP78nIv5GA.... |
| eOiJXfwY2TzOU...... | GijE00wiruuw.... |
| vGFWsxGijN4EM...... | Pax2eQwidaXw.... |

Tenant SSE Index Table

| Index Id | SSE Row Id |
|---|---|
| 0C2EA9D5-39DB-44A2-88FA-A260A62A632D | 0x6400344436003100 |
| 0C2EA9D5-39DB-44A2-88FA-A260A62A632D | 0x63006F116E006600 |
| 0C2EA9D5-39DB-44A2-88FA-A260A62A632D | 0x69006FC174006100 |
| CDD3BFC5-E9CB-487A-91FC-8E936F8B4348 | 0x30005FA8063005F00 |
| A2D5478B-1D2C-4DCE-AF32-9A4A958E9444 | 0x3300388061003000 |
| B1CCCFF1-49C7-4702-AAD1-35ECD7D634FF | 0x9300370061003000 |
| B1CCCFF1-49C7-4702-AAD1-35ECD7D634FF | 0x8300350061003000 |
| B1CCCFF1-49C7-4702-AAD1-35ECD7D634FF | 0x7300650061003000 |
| B26ECEEB-5422-4127-9E15-3492FA3E2D7E | 0x5300330061003000 |
| B26ECEEB-5422-4127-9E15-3492FA3E2D7E | 0x2300350061003000 |
| 0DE7735A-8F76-4C41-932F-A40451468CA4 | 0x1300350061003000 |

SSE Partial Search Algorithm

901 — Search String - Last 4 of SSN = 7634

SSE Processor    902

Keyword Index Table

| Search String | SSE Index |
|---|---|
| (unencrypted for illustration purpose) | (unencrypted for illustration purpose) |
| SSN_3_4_0_7634 | 1B0467E1-6D3B-467C-A770-2EF556D21001 |

903          904

SSE Processor    905

Tenant Index Table

| Index Id | Token Id |
|---|---|
|  | Encrypted |
| 1B0467E1-6D3B-467C-A770-2EF556D21001 | 0x2100344436003100...... |
| 1B0467E1-6D3B-467C-A770-2EF556D21001 | 0x38006F116E006600...... |
| 1B0467E1-6D3B-467C-A770-2EF556D21001 | 0x45006FC174006100...... |

906          907

SSE Processor    908

909 — Encrypted Database

Figure 11C:
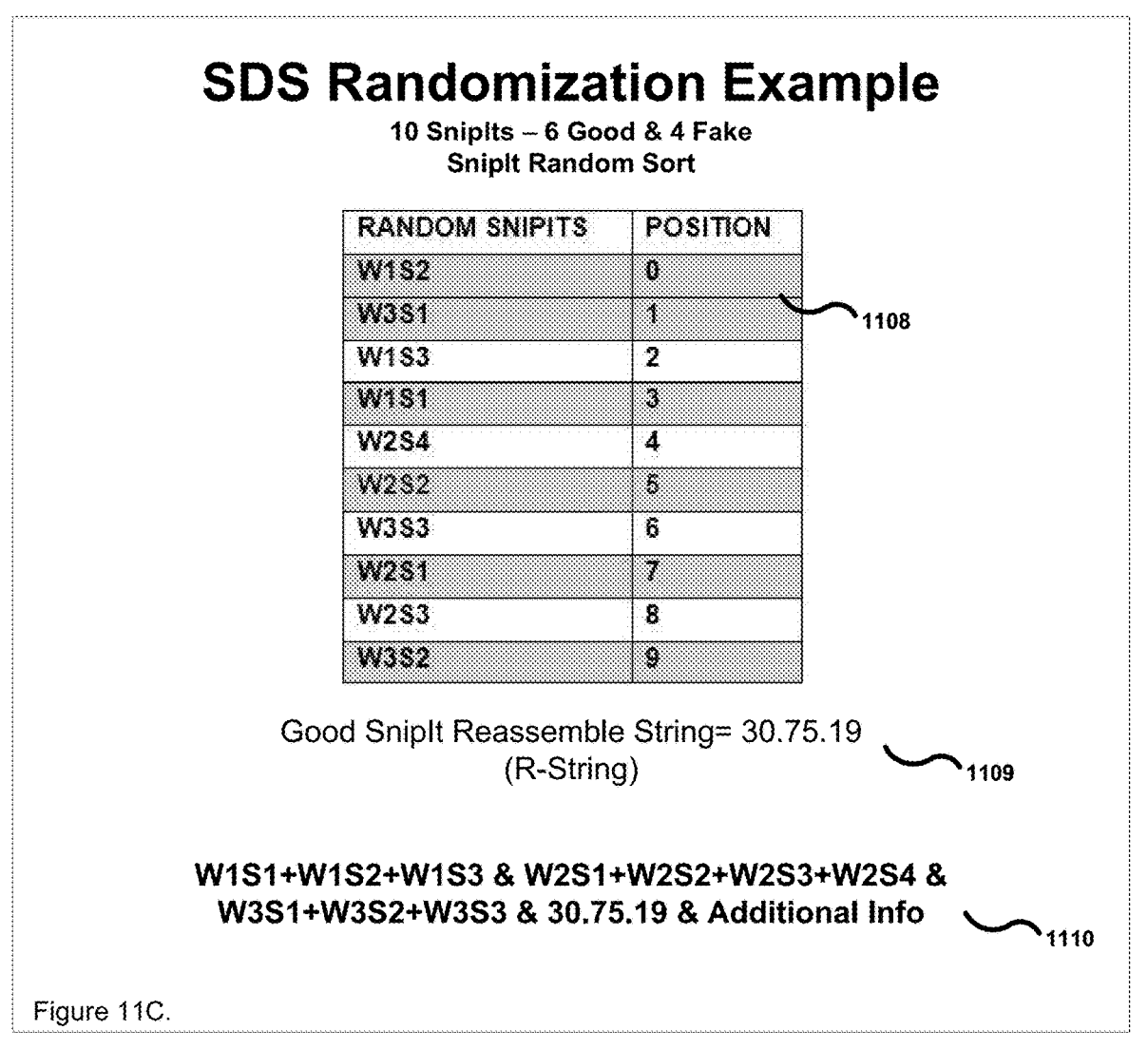

SDS Randomization Example

10 Sniplts – 6 Good & 4 Fake
Sniplt Random Sort

| RANDOM SNIPITS | POSITION |
|---|---|
| W1S2 | 0 |
| W3S1 | 1 |
| W1S3 | 2 |
| W1S1 | 3 |
| W2S4 | 4 |
| W2S2 | 5 |
| W3S3 | 6 |
| W2S1 | 7 |
| W2S3 | 8 |
| W3S2 | 9 |

1108

Good Sniplt Reassemble String= 30.75.19
(R-String)

1109

**W1S1+W1S2+W1S3 & W2S1+W2S2+W2S3+W2S4 &
W3S1+W3S2+W3S3 & 30.75.19 & Additional Info**

METHODS FOR SECURING DATA

CROSS REFERENCE TO RELATED APPLICATIONS

This application claims the benefit under 35 U.S.C. § 119(e) of U.S. Provisional Application No. 63/255,738 filed Oct. 14, 2021, of U.S. Provisional Application No. 63/284,833 filed Dec. 1, 2021, the contents of both are incorporated by reference herein in their entirety.

BACKGROUND OF THE DISCLOSURE

1. Field of the Disclosure

The present disclosure relates to methods for securely processing data, preferably confidential data. Particularly, the present disclosure relates to methods for processing data out of context to assure security. More particularly the present disclosure can use a combination of multiple encryptions, hashing techniques, Homomorphic Searching, two or more Key Owners and database Threat Detection and Response to further enhance the security of the data.

2. Description of the Related Art

The System provides searching the encrypted data in use with Searchable Symmetrical Encrypted (SSE) methods that included field queries (e.g., lookup a last name) and tokens used to restore data. Data queries are most useful when you can enter a partial value and returns rows of data, these computations now create Homomorphic Encryption. Homomorphic Encryption methods allow computation to be performed on encrypted data (e.g., like searching) while the data remains encrypted.

Searchable encrypted data a decade ago, started with straight forward decrypt the data and search plaintext ending with encryption again. This approach ended due to dramatic performance losses. The next approach was to leave small amounts of data unprotected making it easier to search which created leakage. Leakage provides attackers enough data for the traditional attacker toolbox to successfully crack the data's protection. Current approaches are building client-server models where the data in motion and in use are encrypted and decryption is a client-side operation. These new approaches are creating new encryption schemes to facilitate searching. These new encryption schemes may be subject to leakage and may take many years to validate such as other encryption schemes (SHA-256, AES-256, MDE-5, 3DES, Twofish and more) have endured.

Current implementations of Homomorphic Encryption have made great progress but is not viable. One published model was by Song, Wagner & Perrig (SWP) from UC-Berkley. They did demonstrate performance but failed with leakage producing a statistical analysis vulnerability. The failure showed encrypting the natural language (e.g., Smith, Bob, Michael, New York, etc.) provides frequency and size statistics aiding in the reverse engineering of encrypted data (Cracking).

Key Vaults Management (Amazon, Azure, Google, Thales Group, and the like) is the current solution to manage the use of encryption. Key Vaults are cloud services that securely store and access secrets assets. Key Vaults manage API keys, passwords, certificates, or cryptographic keys (SHA-256, AES-256, MDE-5, 3DES, Twofish and more).

Managed Identity (Amazon, Azure, Google, TLA Enterprise, and the like) services provide for the management of user credentials. These solutions add more evidence to identity with biometric (e.g., fingerprint, facial, voice) and user behavior (e.g., typing speed, time of use, and the like). Managed Identity services then provide connection with resources (e.g., applications, communications, databases, and the like) a token to the resource, connect via standards (e.g., SAML 3.0), or a private standard (e.g., Dark Networks). The result is a Single Sign On (SSO) event, eliminating the need to login to every resource.

The use of Key Vaults has addressed the complexities of creating, maintaining and deletion of secret keys to data and content, still nothing has changed, a one-to-one relationship.

Onion Encryption presented in 2005 provides for double encryption of plaintext using two unique keyed ciphers but still only uses one Key Vault. Single Key Vault usage does not meet the level of "Zero Trust".

Threat Detection and Response (TDR) is a methodology that enables security operators to detect attacks and neutralize them before they cause disruption or become a breach. The last decade of solutions demonstrated in FIG. 1. remain focused on perimeter security 100 designed to block unauthorized access to the data 101 by attacker 102. Once the attacker 103 penetrates the perimeter 100, they have access to the data 101. The attacker's process to explore and inventory the data available takes time. IBM's 2021 Report stated the attackers average 287 days before detection. The attack on Equifax went 90 days before detection and Colonial Pipeline went 60 days before the ransom event.

TDR currently is focused on firewall technology and malicious behavior on endpoints. Firewall detection of known malicious signature data from previous documented attacks protect some but not from "Day Zero Attacks". Endpoint Antivirus scanning, Firewall Intrusion Detection System (IDS), and web proxy technologies are all designed to detect intrusion. Once in, the perimeter security is disabled, and attackers roam free with low risk of detection. This leaves the data owner with the highest risk, with usable data unprotected, and plaintext, data in use.

TDR focused on the database itself which provides timely and accurate anomalies. Attackers use new tools inside the perimeter to hack databases, they install malicious tools and hide in the shadows. These tools are designed to find vulnerabilities in software applications and databases (e.g., Brute force attacks, Rainbow attacks, Fuzzing attacks). All attacks produce queries not normal to a productions application/database infrastructure.

Unsupervised Machine Learning should be focused on the database and all of its inputs and outputs, which may quickly identify something that doesn't belong, an anomaly. Unsupervised training consumes real time data and applies algorithms to derive predictions of attack. As an example, one algorithm may be Clustering, the method of identifying similar groups of data in a dataset. Applications have a finite set of programmed queries that interface with the database. These software applications create very defined clusters, while predicting a Fuzzing attack request as an outlier or anomaly.

Database TDR may use Random Forest algorithms to analysis non software applications database usage. Random Forest are models of many decision trees using bootstrapping, random subsets of features, and average voting to make predictions. Databases have several supporting actors (e.g., Access Identity Management, Encryption Keys, Software Applications) that play a role as input and output to the database. Applying decision trees to those inputs and outputs may quickly find what's missing or what doesn't belong, an anomaly. Example could be a Database Administrator (DBA) preforming routine maintenance on a database is determined a threat while even with the DBA access, corresponding Encryption Key input is missing, an anomaly.

Behavior Analysis is an enhancement to Signature based models. Behavior Analysis uses Machine Learning for malware detection. Selected files (e.g., EXE, PDF, ZIP, PPT, and the like) for potential Malware infections are tested for their behavior in an isolated environment (sandbox). These new technologies remain focused on the perimeter ignoring the attacker's goal, the data.

Today, our perimeter data security detection is chasing the attackers' capabilities. Searchable Symmetrical Encryption (SSE) provides a process that allows the data to remain encrypted while "in use". Cryptographic technology has done well for data that is at rest (backups, mobile devices, and removable media) or in motion (HTTPS, FTPS, VPN). Shredded data storage (SDS) was the first to address data in use and provides safe harbor if the data is stolen. Attackers can do other things to data that would still affect the data's availability such as Ransom attacks, data manipulation or deletion. Attacks take time for discovery before their malicious attack is executed. Once the perimeter is breached, there is no detection.

The standard to protect data (e.g., database, flat files) and content (e.g., image, voice, video) has been encryption (e.g., symmetrical, asymmetrical). The National Institute of Standards and Technology (NIST) sets standards across a range of cryptology, for symmetrical encryption AES 256 and for asymmetrical encryption RSA, DSA & ECDSA. Encryption of data and content has many applications for data in motion, data at rest and data in use. Data in use encryption (e.g., CPU, RAM, Storage) is the goal, but reality is it's binary. When the data is encrypted, it cannot be used until it is decrypted. Full Homomorphic Encryption (FHE) combined addition and multiplication via encrypted values. Format Preserving Encryptions (FPE) answered encrypted data for a specific length (e.g., 5 Character Plaintext=5 Character Encrypted). Even though FHE and FPE are encryption in use, their encryption is considered weak (128 bit), and with slow performance.

Encryption is the ability to reverse back data to its original representation (e.g., number, word, formula, etc.). The encryption process requires a secret value to seed the encryption algorithm and is required for decryption. Cybercriminals do not crack encryption, instead they obtain the secret keys and simply decrypt the data or content. The challenge then becomes protecting the secret keys. Data security needs more solutions which protect against attackers inside the perimeter, which have good credentials, and the secret keys.

There is a need for a system and methods to address at least the aforementioned or other shortcomings of current systems and methods for processing data securely.

SUMMARY OF THE DISCLOSURE

The present disclosure provides systems and methods that are designed to solve encrypted data searching challenges of performance and leakage.

The system's Searchable Symmetrical Encryption (SSE), searches using pre-configured indexed tables to return an encrypted Token (e.g., Data). SSE searches encrypted data with minimal cost to processing time maintaining acceptable sub-second performance. Indexing search values (plaintext) with associated encrypted values (cipher) regarding natural language encryption creates Deterministic Encryption (e.g., plaintext=ciphered text). This disclosure is also about the database, with a new and unique perspective.

SSE design creates Probabilistic Encryption (e.g., plaintext #ciphered text) by shredding the data value into multiple sub strings (SnipIt). These SnipIts are stored and are the subjects for processing Indexed Search Tables. This approach of SSE applied to Probabilistic Encryption, eliminates statistical analysis vulnerability (e.g., contemporary hacking tools).

SSE stores data as defined in the setup configuration of use. As part of the setup configuration, searching parameters are defined (e.g., full search, partial, compound, hybrid). These search parameters are applied to each column of the source data as needed. Therefore, when data is captured, the storage and searching index tables are created.

The SSE searching tables are called Tenant Keyword Index, Tenant SSE Index. There are two Tenants (Keyword & SSE) tables created for every column of the source data defined. The Keyword Index created when storing the captured data is shredded. Shredding of full search data creates an index for an item to be used in a search, the data needs to be shredded to prevent its exposure. Once shredded, each shredded data will be added to the index and a parent/child relationship is created to assemble it back when a full search is executed.

The creation of an SSE Query Analyzer optimizes compound searching performance. Analysis to perform the quickest data search return based on the data to search for is presented. Compound searching to support "AND", "OR" and nested relationships (e.g., (<MIKE> AND <MN>) OR (<BOB> AND <NJ>)).

The system achieves "Zero Trust" standard by using more than one key vault to protect data. The System can require two or more key vaults to ensure data stake owners are protected. With two or more key vaults, not one key vault is trusted exclusively.

The system uses key vaults in several ways to create encryption and hashing. There are multiple tables in the system structure where encryption is applied. One method is to alternate keys in the encryption process, another is to double encrypt the data using both key vaults, another is to apply the key vaults randomly to both alternating and double encryption methods.

The system expands the protection and integrity with multiple key vaults where lawful entities can protect the data from alteration or internal threats. In collaboration of data, the system's use of key vaults provide access to data on a truly "Need to Know" standard.

The system key vault content (secrets) used for encryption and hashing are open to market available and accepted encryptions such as but not limited to SHA-256, AES-256, MDE-5, 3DES, and Twofish, the system does not require a specific encryption.

The present disclosure provides a threat detection and response model (TDR) that addresses at least the aforementioned shortcomings of current data security and detection measures and expands into securing a controlled environment.

TDR changes the paradigm from perimeter looking out to the internet, to inside (data) looking out to the perimeter (firewall) and everything else in between. There are devices and programs (actors) designed for specific roles (firewall, key vault, identity management, applications) securing data and all can have an active role. These actors can generate records on activity (collectively: "telemetry") data of all activity, and this interaction is recorded in both actors' logs.

Service requests and the collection of this data from many actors can demonstrate a predictable activity or personality under normal operations.

The present disclosure provides for an TDR Application Program Interface (TDR-API) with methods enabling the collection of data from applications replacing the need for log files. Application developers traditionally focus on the user experience on the front end and do minimal log output, primarily these logs focus on tracing bugs on the backend. Developers can integrate with the TDR-API to input data with a security information focus.

An example would be an attacker's use of Fuss (e.g., bot(s) looking for hackable software bugs) that most systems reject at the API and don't log. These events are very important to TDR, especially if it originates inside the perimeter.

A request for data may start with a user navigating the firewall, authenticating with the identity manager, placing a request value in the software application which accesses the key vault, finally accessing the data and returning the results. All these actors played a part in servicing the data request and produce logs, telemetry, or other signals containing the event. This data is massive producing millions of rows and much of this data is too much for people to review manually (e.g., finding a needle in a haystack).

Machine Learning (ML) may be used to reconcile actors' telemetry for a user request in a real-time or near-time process. Realtime may require more application specific design because some actors' telemetry output is delayed in their writing of the activity (e.g., to logs when batching output). Attackers use tools and methods (SQL injection, brute force bots, rainbow tree bots, PowerShell and more) to discover the data and how to escalate access. This attacker activity is not normal communications about the data and can be identified.

TDR has designed anomaly detection with Random and Isolated Forest, boost algorithms, Clustering algorithms in an Unsupervised Machine Learning designed to produce attack outliers. In each database request, the process described herein finds "what does not belong" or "what is missing" when compared to normal operations.

An example is when attacker's start automated tools (e.g., brute force, rainbows, fussing) to crack encrypted data, TDR is the only actor that can recognize the anomaly and execute the response. Further, attack outliers can be categorized by the activity detected and measured.

Once ML attack outliers are found and categorized, TDR can trigger the appropriate response. Reponses can send email or text alerts to security personnel, produce honey data, start forensic tracking, limit access, or completely shut the system down. Any of these responses can be applied per-user or as widely as the overall system. Attackers may hide inside the infrastructure for multiple days, weeks, and months without regard of being detected even with their own foreign applications executing on the victim's internal servers.

Honey data is appropriate misinformation and can be designed to be interpreted by the attacker as good data creating at least a temporary belief of success. Honey data can include data markers identifiable by the data owner proving the source of the data. Honey data creates trackable data which can be flagged across many government agencies (IRS, FBI, ATF, etc.). Honey data can populate the attackers point of presence with "Crimeware" to execute much like malware, forensic code designed to identify the attacker. In other cases, honey data may be old or otherwise less useful data.

A second TDR response is telemetry to the Threat Detection Telemetry (TDT) Host. The TDT receives many messages from many SSE Programs. As deployment of SSE Programs expand, all will provide telemetry on SSE Program anomalies and other system metrics to the TDT Host. The TDT Host will further analyze anomalies for predictive threat analytics, threat intelligence, and system enhancements.

One of the techniques attackers use is to remove the software application codebase and modify it for their own purpose (e.g., miscount numbers, delete data, export data, etc.). This modified codebase is then returned for normal operations, or the attacker's operations. Industry standards to detect codebase modifications is to checksum or hash the codebase files creating a digital signature and storing it for comparisons. The digital signature then can check against the runtime digital signature for a mismatch indicating a codebase modification. Attackers can generate and forge their own digital signatures to match what's been stored and fool the comparison detection. A third TDR method of detection is to randomly slice the codebase into fragments and checksum or hash each fragment and store the shredded signature for comparison. This method now requires the attacker to guess where the codebase was fragmented.

Secret keys are being stolen from many sources (e.g., CPU, RAM, storage, in motion) and this disclosure provides the ability not to reveal the original data or content if decrypted and exposed. The Shredded Data Storage (SDS) solution can produce encryption like protection with secret keys and without secret keys. That SDS will take many years (e.g., 104) to reassemble the SnipIts to their original value and original context. The high entropy produced using random events, and not secret keys produces non-determinist relationships which might be impossible to reverse engineer or crack. This disclosure will demonstrate how SDS goes beyond encryption.

BRIEF DESCRIPTION OF THE DRAWINGS

FIG. 3 illustrates an embodiment of threat detection & response application program interface.

FIG. 8 is an example of an SSE partial value search.

FIG. 11C is an example of an assembly process generating the reassembly String.

DETAILED DESCRIPTION

Figure 1:
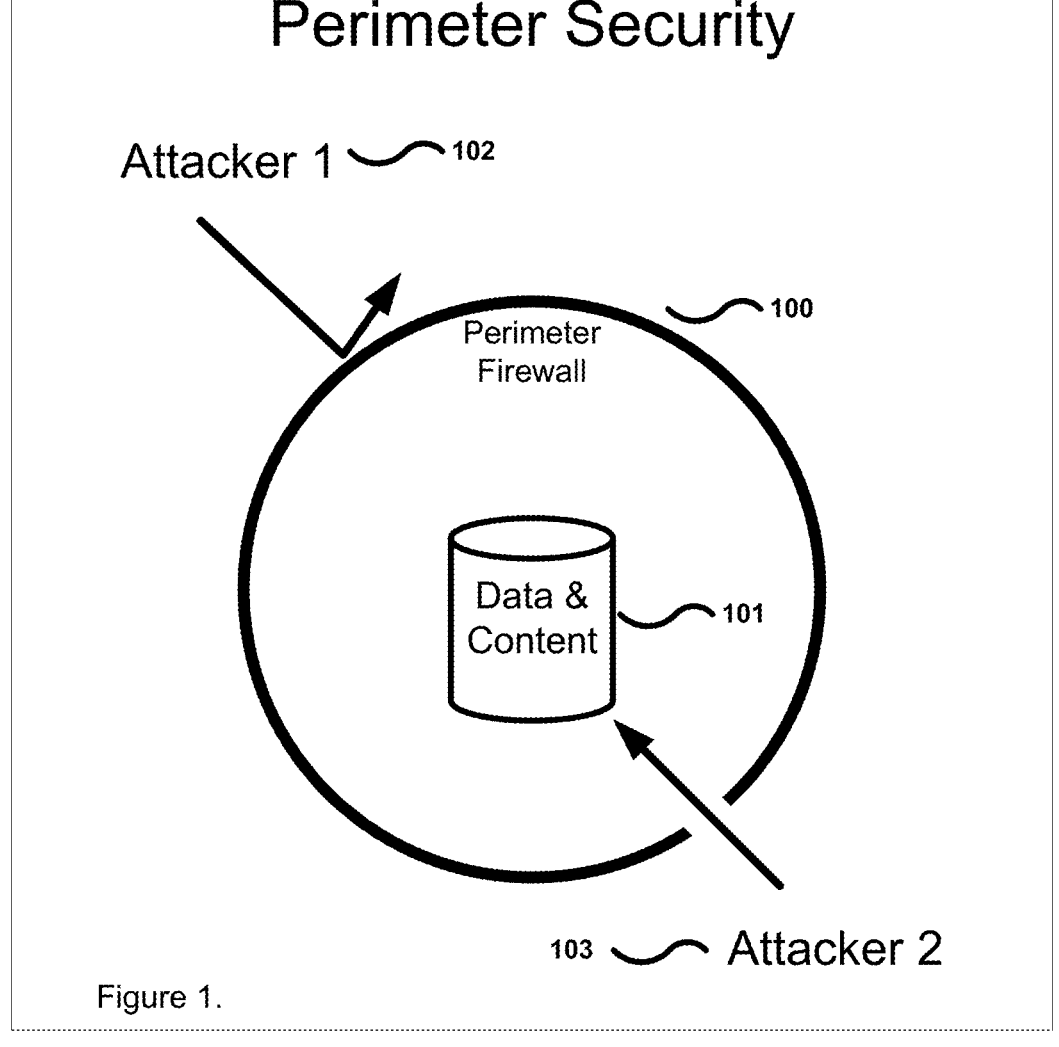
FIG. 1 is a diagram of a known typical perimeter security protecting an internal database.
Figure 2:
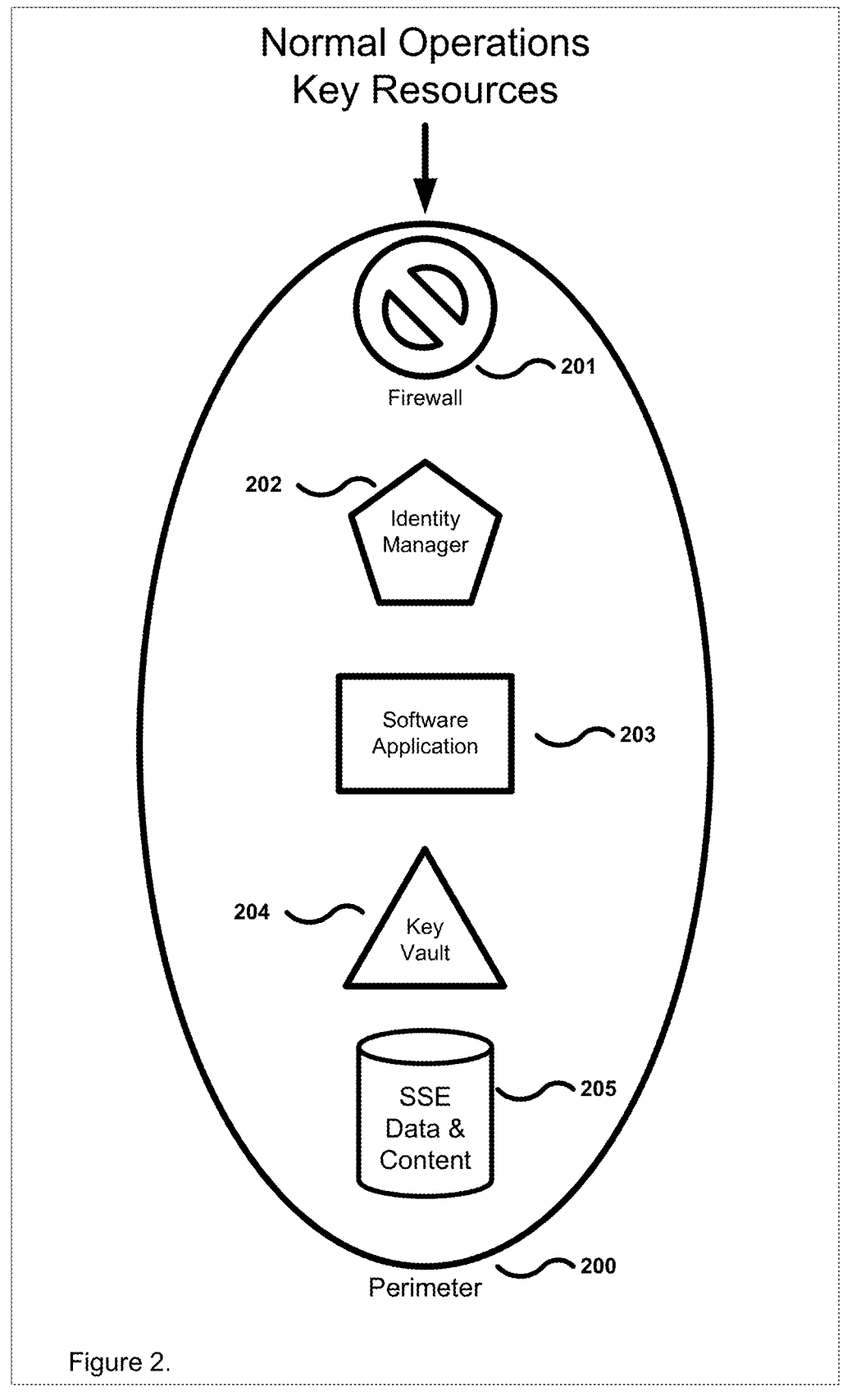
FIG. 2 is a diagram of example services to access a database.

An example of SDS Normal Operations protected by Perimeter Security 200 is shown in FIG. 2. Database access begins when an URL (Uniform Resource Locator) navigates the Firewall 201. Next is the need to identify the user or the one producing the URL with Identity Management 202 (e.g., login, device, biometrics). Access to the Software Application 203 now allows application specific queries to the SDS database. To execute the query now requires the keys from the Key Vault 204. Once the keys are retrieved, the SDS Database 205 can now return the results to the Application 203. An SDS database is discussed here as an example, but other databases and similar services can be used instead as known to a person skilled in the art.

FIG. 3 illustrates a Threat Detection and Response Application Program Interface (TDR-API) data flow and events 308 where actors program to the TDR-API methods on events the actor may want TDR to evaluate.

An example is the firewall 300, that an administrator can integrate to the TDR-API events liked blocked traffic on the internal network. This block event in real-time sent to the TDR can help the TDR-ML to predict an anomaly.

Web Services 301 can produce a TDR-API event for session hijacks or expired cookies errors. Application Services 302 can call the TDR-API for malformed input errors. Identity Management 305 can produce TDR-API events for login in failures or login status. Key Vaults 306, 307 can produce TDR-API events when incoming application or database request fails authentication.

The SSE Database 304 is the center of the detection process. The attacker's goal is to talk to the database, learn about it, look for defenses and finally, cause harm (e.g., data exfiltration, data ransom, data destruction). The SSE Database will produce TDR-API events for many error conditions generated while in use. These events 308 will be collected at the TDR Engine 303. Eventually the attacker will conduct some iterated queries which the TDR Engine 303 will detect without actors. Although much discussion here refers to SSE, this is just an example of a database type that may be best in some uses. Non symmetric encryption, deterministic encryption, or other types of encryptions can be substituted in the place of SSE for any of the systems and embodiments described herein and all the embodiments disclosed will function and provide the benefits as described in this disclosure. The term SSE is meant to be inclusive of such use, not exclusive.

An example is a cross-site request forgery query request to the SSE Database; this means previous security measures have been defeated. A cross-site request forgery request falls out as an anomaly because it is not in the normal operations cluster. The TDR will then trigger an appropriate response.

SSE Program 303 maintains the different Artificial Intelligence (AI) processes used for maintaining encrypted state, health checks, TDR, and others. TDR uses Machine Learning algorithms for Unsupervised training, Clustering, Isolated and Random Forrest and Boost for anomaly detection and other SSE processes.

Figure 10:
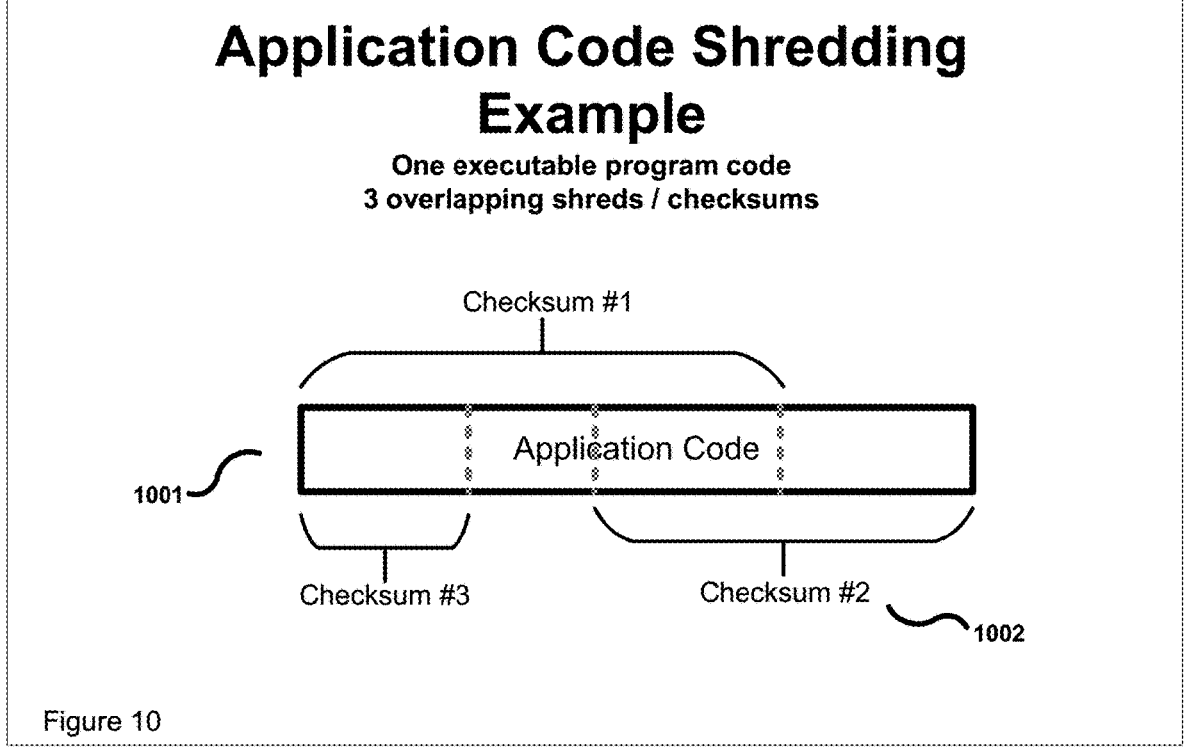
FIG. 10 is an example of application program code can have shredded checksum to evaluate checking for change.

SSE Program 303 can be protected by shredding the application code base. Most applications are a collection files (e.g., EXE, DLL, BIN). These files are subject to malicious modification by attackers. Attackers have demonstrated the ability to forge code signatures, code size and code dates. In FIG. 10, the SSE Program code 1001 is shredded into fragments and then a checksum 1002 is calculated for each shredded fragment. Code shreds overlap as demonstrated in FIG. 10. Code shreds are stored and programmatically referred to frequently comparing stored values against running code shreds checksum values. A mismatch of any checksum values will be alerted on as altered program code.

FIG. 3 shows Firewall 300 can output logs or real-time event data about incoming requests from users, communication between servers, or other network activity.

Web Services 301 and any attendant logs can provide information including loads or calls to different services that contribute to servicing user requests.

Identity System 305 can provide information including user login events or durations, identity check access events, evaluations of the identities related to a request, or the likes.

App Services actor 302 can provide telemetry including diagnostic logging for app services, file system usage, failed request tracking, detailed error messages, and the like.

These different actors can utilize the TDR-API referenced in 308 to push threat data to the TDR.

The SSE Database 304 can push database activity to the TDR in 303.

Key Vault actors 306 and 307 are shown as two different key vaults but can consist of any number of key vaults. Key Vault telemetry information can include information relating to access permission checking, event to user mappings, categories or types of access made by specific users or apps, and the like.

Figure 3A:
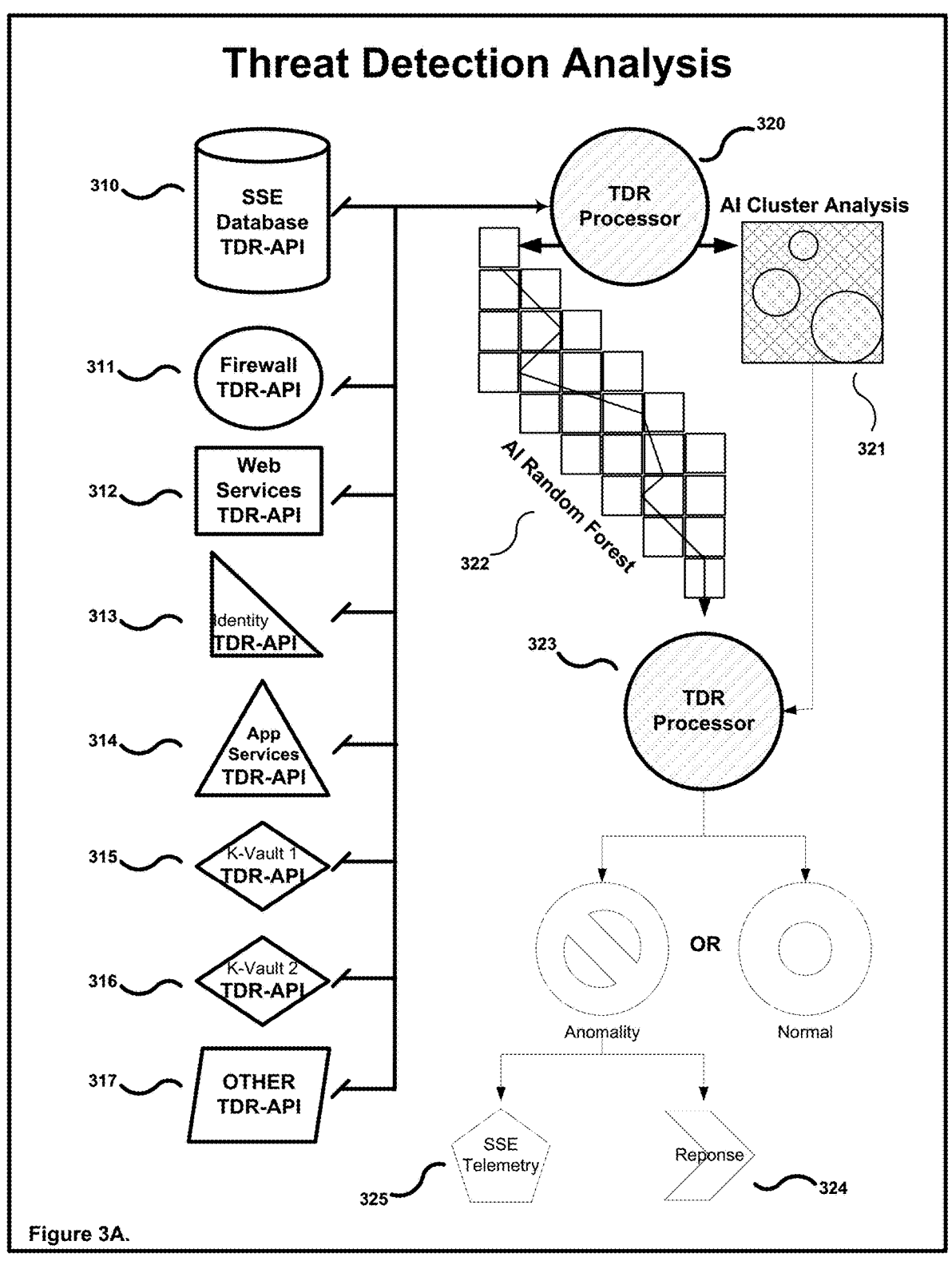
FIG. 3A illustrates an embodiment of threat detection analysis starting with the SSE Database and other possible contributors.

FIG. 3A shows elements of threat detection and response (TDR) that can contribute to the analysis of incoming threats. Items 310-317 show some example actors that may produce telemetry such as logs, messages, records, usage levels, or other data that can collectively contribute to the telemetry used in analysis.

FIG. 3A shows the many actors 310, 311, 312, 313, 314, 315, 316 and 317 using the TDR-API to push meaningful information (e.g., malformed statement, failed access, missing or wrong encryption key, to many tries, time outs, and the like) to the TDR Processor 320 algorithms. This direct integration ensures real-time data that can be analyzed. SSE Database processing application requests (e.g., normal operations) are processed by Clustering 321 detecting unusual requests; called outliers.

These unusual requests are then processed by the AI Random Forest 322 to determine if they threaten the SSE Database. TDR random forest algorithms provide higher accuracy through cross validation of large data sets (e.g., TDR-API input). When the TDR Processor 323 produces an anomaly or normal operation request, an anomaly will trigger the appropriate Response 324 and SSE Telemetry 325.

In FIG. 3A, other logs 317 generally relate to telemetry derived from or received from other actors. For example, these logs can include information from specific related services, hardware, software, network, memory, operating system, or user interface elements of the overall system. In some examples, the other logs 317 can include telemetry information from the user's computer that sent a request. In another example, the other logs 317 can include telemetry information from a network point along the path between the actual user and the protected system. In another example, the other logs 317 can include file information on the local server and/or comparisons of this information with reference information. In another example, the other logs 317 can include CPU usage or load information, in some cases compared to predictions or historical values. These are examples and are not meant to be limiting and other actors or telemetry sources can be evident to one skilled in the art or may be mentioned elsewhere in this description.

SSE Database actor 310 can relate to signals specifically generated by the SSE database. These signals can be the specific to the application at hand, even though they may have a relatively small view of the overall life cycle of a user interaction. Database logs can include specific information on the validity of input tokens, reference IDs, input data, or general data validation, for example. In a specific example, the SSE Database actor telemetry notes if a request had null or invalid data. In another specific example, the SSE Database actor notes if an interaction involved repeated transaction IDs or repeated similar accesses. In some cases, the SSE Database actor telemetry can include some filtering or conditional reporting to cut down on the amount of telemetry reported.

Some or all of the telemetry from the actors 310-317 can be ingested by TDR Processor 320. This processor 320 can perform various data preprocessing including normalization, batching of telemetry events to group together events related to a single request or group of requests, removal of data deemed erroneous, removal of data deemed less important, encoding of data, scaling, dynamic time warping, binarization, standardization or other data cleaning and preprocessing.

The data processed by the TDR Processor 320 can then be subject to evaluation such as cluster analysis 321, decision tree or random forest 322, or other forms of evaluation (e.g., state vector machine, similarity matching, collaborative filtering). In some cases, the data can be subjected to multiple forms of evaluation.

The results of the evaluation by units 321 can be further processed by TDR processor 322 to produce a further result. That result may be a classification such as normal or anomaly, or a suspicion or decision how to respond. The result can, in some examples, include an estimate of the confidence the system has in the result. In some cases, the result can include generation of additional telemetry 325 or a suggested response 324.

Although the TDR Processor is shown split up here to illustrate multiple evaluation paths, the units shown here as 320-322 can be implemented as a single body of code or service. In other embodiments, it can be split into modules as shown or in another arrangement.

In some embodiments, the SSE telemetry can be used as an input to TDR Processor 320 in the future or viewed as an input actor. For example, an unusual event that does not rise to the level of a response may nonetheless generate SSE telemetry 325 in a form that may later cause TDR Processor 320 to increase attention on later telemetry involving a similar or related user, action, session, key, or data. In other embodiments, SSE telemetry 325 can serve as a digest or summary of an event. SSE telemetry 325 can consist in an entry in a database table, a value stored in memory, a change of state within the Processing path 320-322, or other form of electronic data storage.

In a more specific nonlimiting example, an unusual event evaluated from telemetry received from actors 310-317 can be evaluated as an unusual command by AI processors and evaluation paths 320-322, but not unusual or threatening enough to generate a response from that one event. The system can instead generate SSE telemetry 325, stored in memory, which will increase attention on any further use of the unusual command. Thus, if the same unusual command is used later by the same or even different users, the thresholds for response may be lower. In this example, the system can detect attackers trying a suite of commands (including an unusual one) against different accounts and endpoints. In some cases, this means that attackers using a so-called "zero-day" exploit against multiple users can be detected by virtue of their zero-day attack including uncommon commands or command patterns.

Response 324 can send email or text alerts to security personnel, produce honey data, start forensic tracking, limit access, or completely shut the system down. Any of these responses can be applied as specifically as per-user or as widely as the overall system.

In some cases, the classifier can become a component of the "other" actor 317 to generate synthetic telemetry inputs to the TDR Processor 320. In other cases, a resulting classifier can join or replace some or all of the evaluations 321.

Figure 3B:
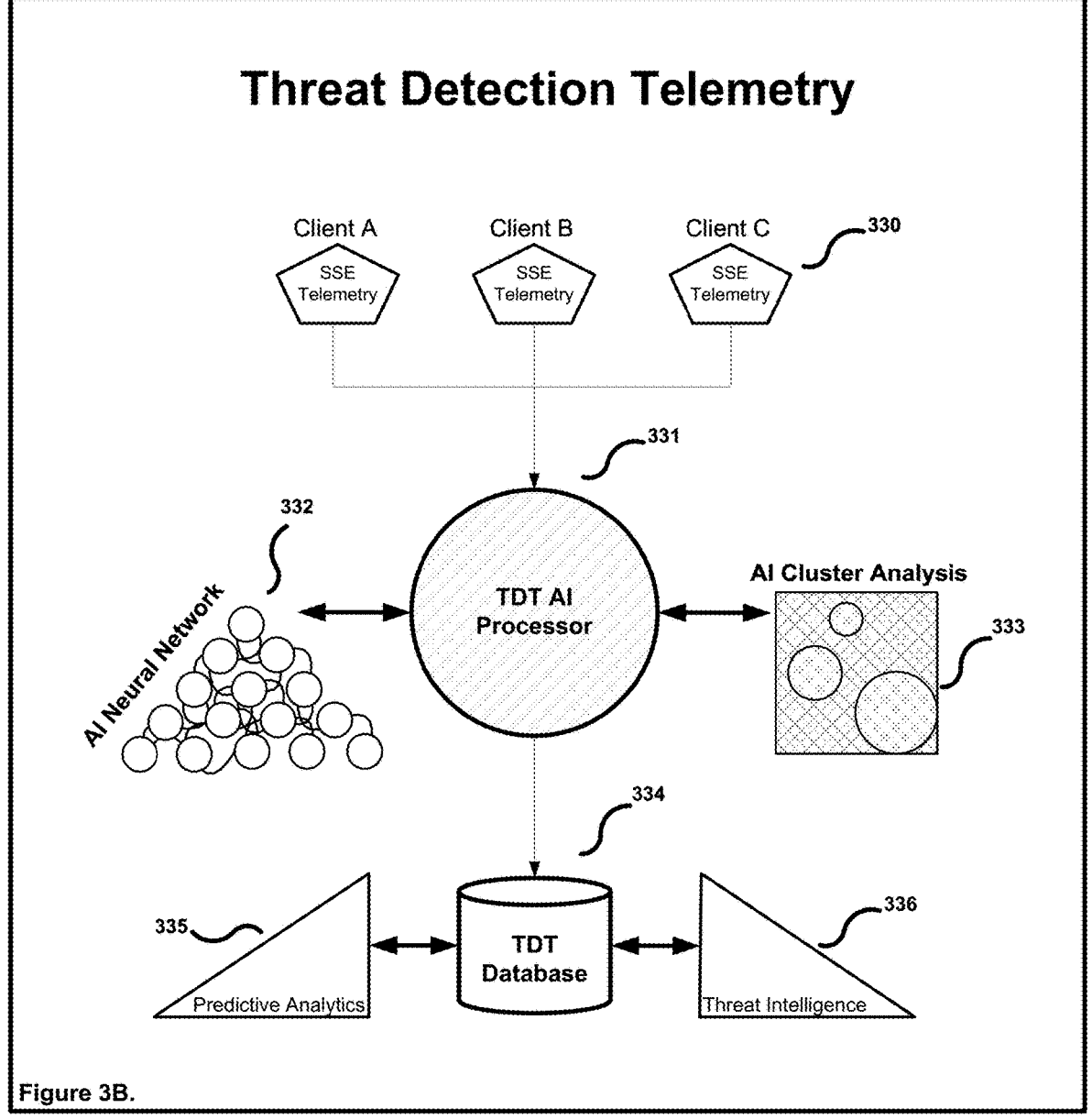
FIG. 3B illustrates an embodiment of threat detection telemetry where analytics are refined and used against attackers.

Threat Detection Telemetry (TDT) is illustrated and described in FIG. 3B receives from participating SSE Databases TDR anomalies. A plurality of SSE Database users could participate and benefit from a predictive analytic system that could enhance their perimeter security.

In FIG. 3B, SSE Database nodes 330 push to the TDT AI Processor 331 via the TDT-API anomalies detected. The TDT AI Processor 331 will process incoming anomalies through cluster algorithms 333 to identify similarities and characteristics. In addition, anomalies will process through a Machine Learning Neural Network 332 to build training sets documenting anomalies and their probability as a threat. These ML Training Sets will be stored in the TDT Database 334. The TDT Database 334 will provide access to predictive analytics 335 and threat intelligence to include creating static signatures for enhanced detection (e.g., SSE TDR). TDR analysis can create static signature definitions specifically for database attacks to enhance detection.

In FIG. 3B, shows SSE telemetry from multiple clients 330 entering a Threat Detection AI processor. This SSE telemetry can, in some examples, include output SSE telemetry 325 from FIG. 3A. In some embodiments, the SSE telemetry 330 references telemetry from actors 310-317 and includes such telemetry or a reference to where such telemetry can be accessed.

The separate clients 330, such as clients A, B, and C in FIG. 3B, can represent different users in the same account, multiple accounts, multiple physical client computers, or and other grouping or separation of the sources of telemetry.

In one example, the various pieces of SSE telemetry 330 can come from different client databases storing information for different companies. In this way, broad industry level threats that are set to scan many targets can be detected by their similar events applied to disparate corporate accounts.

In another example, the various pieces of SSE telemetry 330 can come from multiple users on the same database. In this way attacks that use multiple accounts to attempt to exfiltrate data from the database faster can be detected.

The TDT AI Processor 331 can be configured to perform various steps similar to those listed above for TDR Processors 320 and 323, while evaluation paths 332 and 333 are again just nonlimiting examples and any of the evaluation paths permitted in the discussion of elements 321 and 322 can be used here without limitation. The TDT AI Processor 331 can also be a single unit or split up as shown in FIG. 3A with Processors 320 and 323. The TDT AI Processor 331 and evaluation paths 332 and 333 herein are shown processing telemetry 330 from multiple clients to allow security analysis to be applied across the separate clients.

The output of the TDT AI Processor can be stored in a database 334. This information can be analyzed in real time or later in bulk to generate predictive analytics 335 and threat intelligence 336.

In one embodiment, the TDT AI Processor 331 can receive telemetry from multiple clients 330 that includes both information on an access event (e.g., from client A, which may be datacenter systems) and information that identifies specific events as adversarial or "hacks" (e.g., from client B, which in this case can be manual reporting or analysis entries). The TDT AI Processor 331 can then group and analyze using AI cluster analysis 333 or a random forest 321 (the specific types of analysis 332 and 333 are nonlimiting embodiments as discussed above). The evaluation at a random forest and/or cluster analysis can result in a classifier which can be a part or all of an example of predictive analytics.

In another nonlimiting example, in FIG. 3B the TDT AI processor 331 can receive telemetry from multiple clients 330 that includes both information on an access event (e.g., from client A, which may be datacenter systems) and information from a separate implementation of the SSE system on another server (e.g., as client C). The TDT AI processor can use AI Cluster analysis 333 or another form of machine evaluation to determine that events on the two systems, while independently not enough to trigger a response 323, happening together within a relevant span of time, constitute enough to raise a response 324 such as a notification or alarm. In some cases, this can contribute to threat intelligence outputs 336. In some cases, this can include generating a predictive analytic 335 that will contribute to TDR Processing 320-322 (e.g., as a telemetry input as part of 317, or as an alternate or supplement to evaluation 321). In this way, suspicious activity recognized by events across multiple accounts, users, or servers can generate new monitoring sensitivities at the single server or user level to make such systems aware of new attack types.

In another nonlimiting example, in FIG. 3B the TDT AI processor 331 can receive telemetry from multiple clients 330 that includes both information on a data event and information that identifies specific events as "known good" transactions. For example, an initial data event can generate a Response 324 in the form of a warning to an authorized user which expresses suspicion and prompts them to validate whether the event was known and approved. In some embodiments, a portion of an event population can be marked as "known good" (e.g., by client B, which in this case may be the result of an authorized representative authenticating and authorizing the event). The TDT AI processor 331 can then group and analyze using AI cluster analysis 333 or a random forest (recalling that the specific types of analysis 332 and 333 are nonlimiting examples as discussed above). The evaluation by the example random forest and/or cluster analysis can result in a classifier which may be a part or all of an example of predictive analytics. This classifier can then be used as described above to augment the inputs or evaluation process shown in FIG. 3A in order to prevent such events from triggering responses in the future.

Threat Detection & Response; database and other content (e.g., Images, Video, Audio) are the objectives for attackers. Once attackers are inside the perimeter the last defense is the database.

Figure 3C:
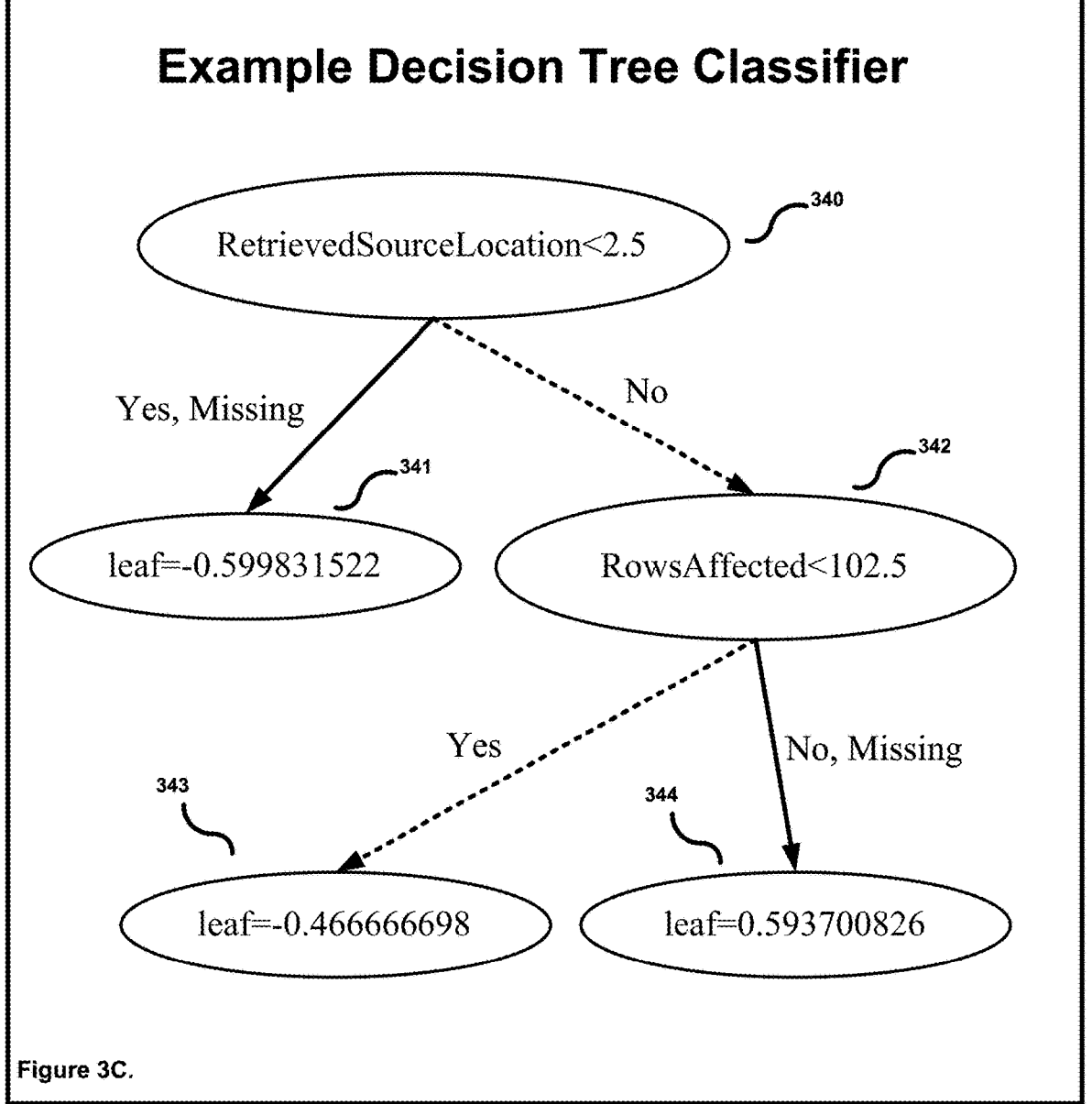
FIG. 3C illustrates an embodiment of a decision tree analysis.

In some cases, the classifier is used to generate a decision tree that can be reviewed by a human operator to understand and adjust. A simple example of an output decision tree classifier is shown in FIG. 3C.

Software Applications (Programs) interact with the database continually which we will call "Transactions". These Programs are static for the most part and have a location (e.g., C:\Applications\Program). In addition, Programs have properties (e.g., Filename, File Size, Date Created, Last Modified, and the like) stored in operating systems, log files, and configuration files that begin the decision tree process.

When the SSE Database receives input the Retrieved, Source, and Location (RSL) data is processed by the Root Node to obtain a weighted ranking score 340 of trusting the Transaction. In this example, the RSL threshold 340 is set to less than (<) 2.5 ranking score. Transaction less the 2.5 score then calculate the Gini Impurity result for the leaf 341. Transaction greater than or equal to (>=) 2.5 move to the next Node, "Rows Affected" 342. The Rows Affected Threshold is set to less than (<) 102.5, so SSE Database rows returned less the 102.5 calculate the Gini Impurity result for the leaf 343. Those SSE Database rows returned greater than or equal to (>=) 102.5 calculate the Gini Impurity result for the leaf 344. The leaf with the lowest number 343 can predict that the Transaction was safe and not the actions of an attacker.

Random Forest are the creations of many Root Nodes via Bootstrapping, randomly moving Nodes around and calculating the Gini Impurity for each event combined with Bagging analytics for a model that has the highest accuracy of an SSE Database threat anomaly.

Figure 4:
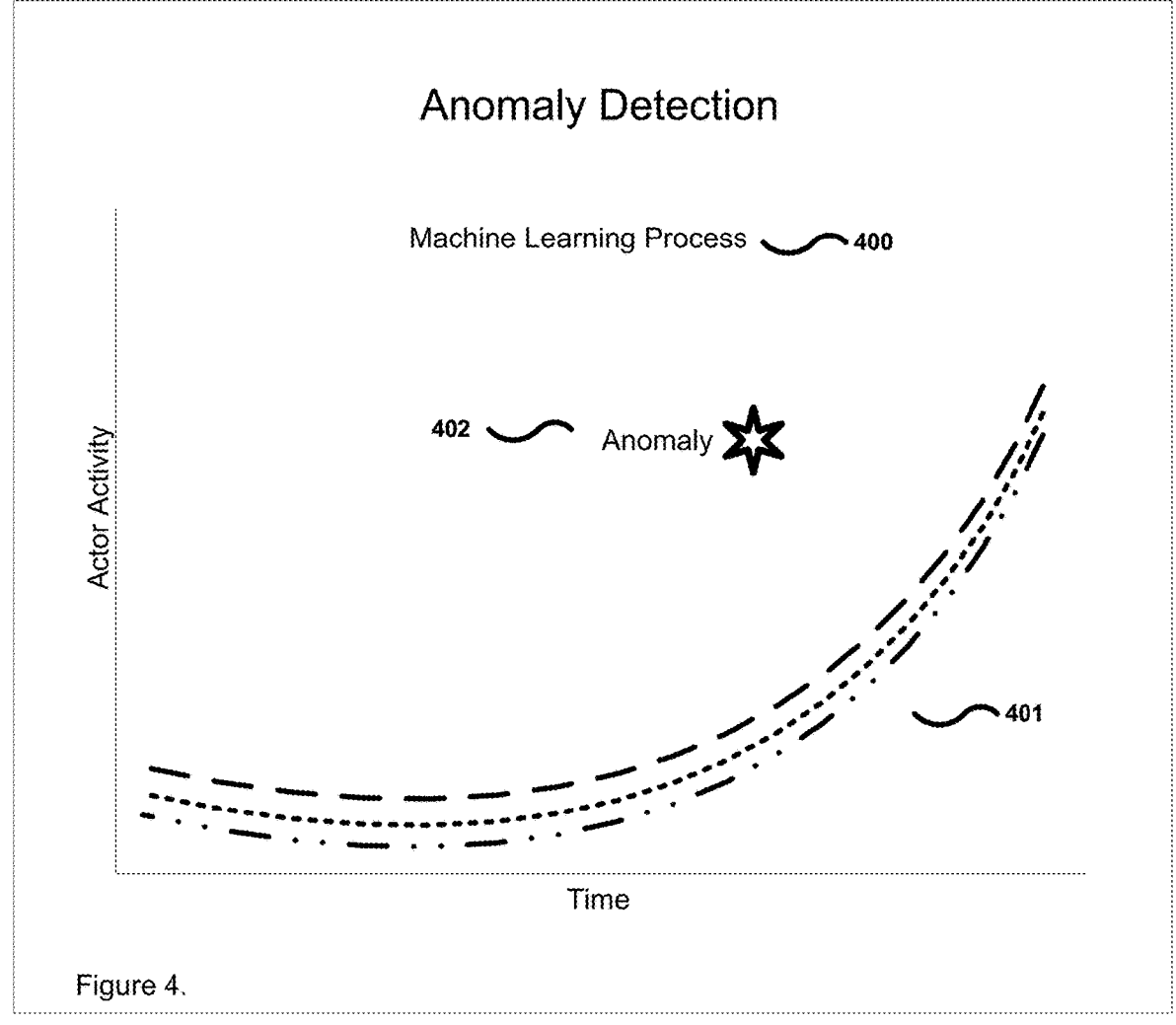
FIG. 4 is a graph demonstrating normal operations for accessing the database.

Referring to FIG. 4, a graph demonstrating normal operations for accessing the database is illustrated. SDS TDR is designed to work inside the database and monitor database activity for threat detection. Attackers do not conduct normal operations and therefore create an anomaly. Outside actors (e.g., business applications, key vaults, identity managers, firewalls) can develop or integrate to the TDR-API for real-time events they capture. The TDR-API will provide methods where the developers can exchange explicit information consistently for focused analysis. This will greatly improve the efficiency and effectiveness of anomaly detection significantly reducing the number of false-positive alerts that traffic sniffers and log readers produce. An example of Anomaly Detection is Unsupervised Machine Learning 400 clustering algorithms classifying all software application activity into repeatable events (e.g., searching, creating, editing, deleting) creating a unique personality as illustrated in 401. When the SDS database receives an unfamiliar query 402 the ML predicts an outlier or anomaly. Outliers may be processed by other algorithms for final disposition.

SSE design creates Probabilistic Encryption (e.g., plaintext≠ciphered text) by shredding the data value into multiple sub strings (SnipIt). These SnipIts are stored and are the subjects for processing Indexed Search Tables. This approach of SSE applied to Probabilistic Encryption, eliminates statistical analysis vulnerability and avoids Deterministic Encryption (e.g., plaintext=ciphered text).

Figure 5:
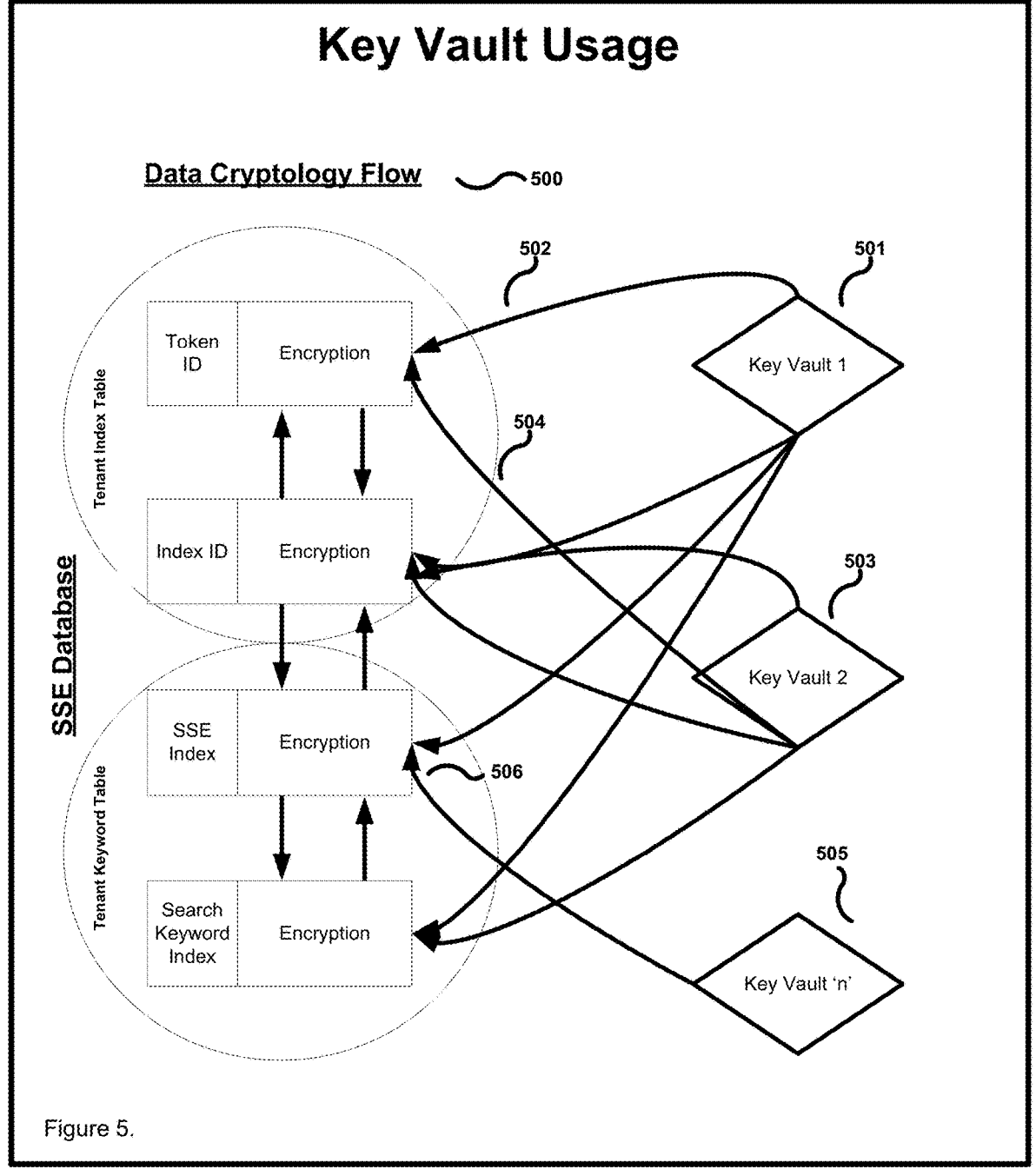
FIG. 5 illustrates an embodiment of multiple key vaults when applied to a series of encryptions and/or hashing.

As illustrated in FIG. 5, the Data Cryptology Flow 500 will use multiple Key Vaults. The SSE Database has two tables (e.g., Tenant Keyword Table and Tenant Index Table)

and each table has two columns. SSE Program will conduct static and random selection of key vault usage to reduce trends and patterns.

As a nonlimiting example, in FIG. 5, Key Vault 1, 501 provides an encryption key to the token table for a column 502. Key Vault 2, 503 provides an encryption key to the token table for a column 504. Both key vaults are required to properly retrieve the token needed to decrypt the plaintext data. Both organizations are thus cryptographically protected from a single bad actor, creating a "Zero Trust" situation where organizations do not have to trust any single person or service provider.

Key vault "n", 505 as a nonlimiting example only supports the SSE Index 506. One key vault (e.g., Regulatory or Kill Switch) with one action can stop the operations. Zero Trust guiding principal eliminates all alternative access (e.g., back door, break glass, overrides).

The use of Unsupervised Learning is unique and applied to unstructured data coming from multiple sources to the database. First, the SSE processor processes each individual request and separates normal events from suspects lines.

As an example, developers write a finite number of database queries for a given business application. Unsupervised Clustering will learn those developer's queries and cluster them, therefore when a query is received and not recognized (attacker) an anomaly is created.

Homomorphic Encryption (HE) is defined as the ability to conduct computations on encrypted data without first decrypting it. HE uses computations to embody all computing including calculations. Computation in computer science means any type of calculation or use of computing technology in information processing to include database activity (e.g., search, create, read, update, delete). The present disclosure does not perform direct calculations but performs all other database computations.

Searchable Symmetrical Encryption (SSE) applied to shredded data obtains Homomorphic Encryption by the search on encrypted data with partial encrypted search strings where computations are performed.

For example, the search for last name "Suleski" may return many rows of "Suleski". The search for last name beginning with "Sul" may return many rows of "Suleski", "Sulayman", "Sule", "Sulamita" and more. The SSE partial string search is a computation.

SSE computes the searching data by building two columns (Search String and SSE Index) in the Tenant Keyword Index Table and two columns (Index ID and SSE Token) in the Tenant Index. Computing and storing the search string is done with several algorithms supported by user configuration describing how their users and applications search the database.

The configuration can provide full and partial field value searches (e.g., Last Name, Social Security Number—SSN,) along with relational searches across multiple field values (e.g., Last Name AND SSN, Last Name OR SSN). This process does not decrypt any database field values to executed. SSE algorithms work with both tables to create an encrypted set of tables capable of receiving a secure plain-text value and return a pointer to a token or encrypted data for further processing.

SSE Tenant Keyword Index Table: Search String field eliminates statistical analysis leakage with shredding the data value and encrypting the sub-stings called SnipIts, with a series of encryption using partial bits from left to right and right to left, added to encrypted Salt values and all the bits are encrypted using one or more key vaults.

Tenant Keyword Index Table: SSE Index, the second column, is the twice encrypted value from the SSE Tenant Keyword Index Table: Search String field. The Tenant Index Table: Index ID is the first-generation encryption of the SSE Tenant Keyword Index Table: Search String field.

Tenant Index Table: Token ID is the encrypted value of the pointer (location) to the source database value. Encrypted databases (e.g., TDE, SDS) can now use encrypted searches and only decrypt return values to the user as needed. This homomorphic encryption now provides the ability to search encrypted data in use.

Figure 6:
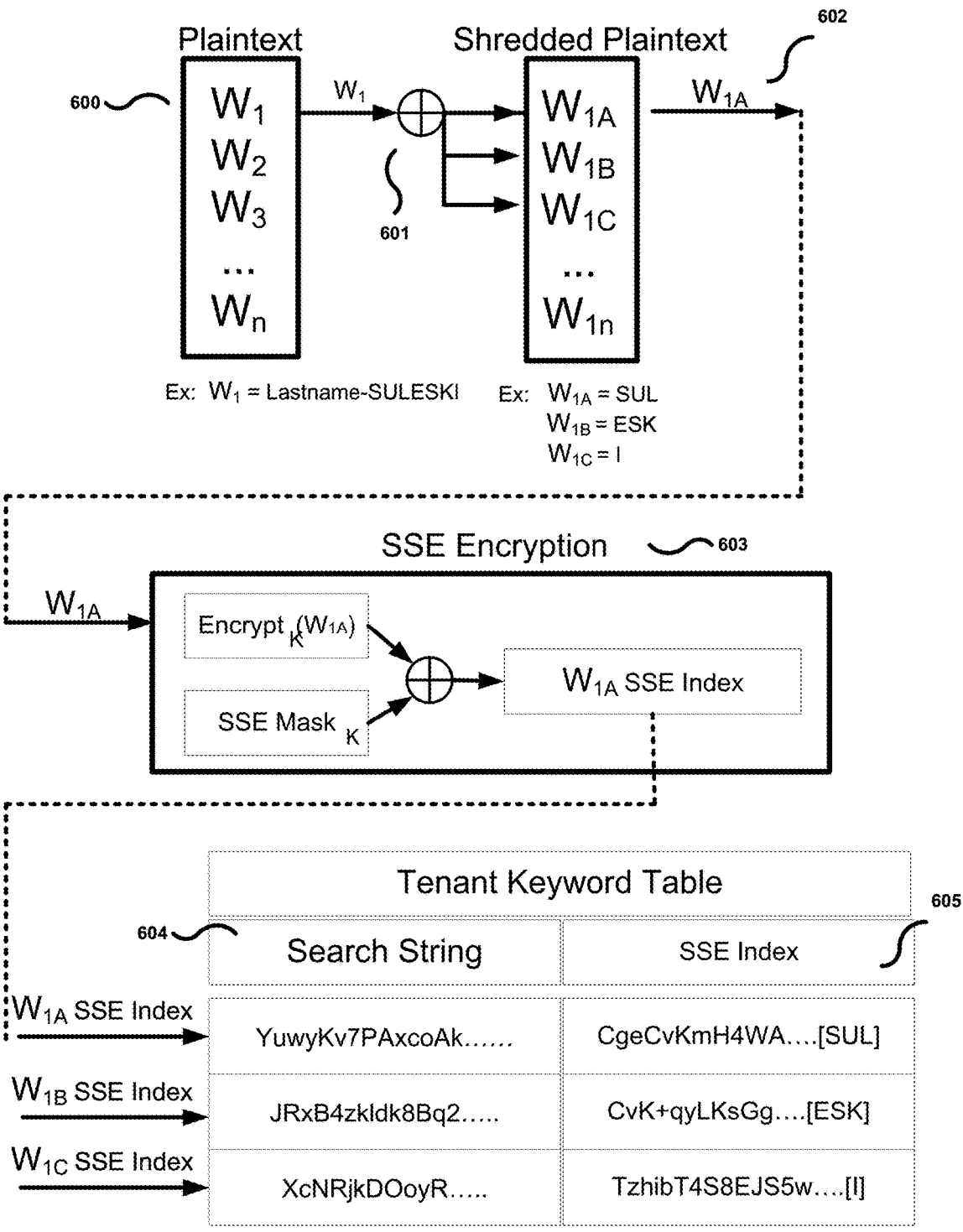
FIG. 6 is a flow of Tenant Keyword Table value creations.

FIG. 6 illustrates how a record is created in the Tenant Keyword Table, and how the created record is processed by the SSE Program algorithms. A record is created or updated in the SSE database at 600 through the application server (e.g., JSON Query POST with the values to be created.)

At 601, SSE Program (e.g., algorithms) triggered by operations in 600, reads record information from the API POST message and shreds the value into sub-strings called SnipIts as defined by a previous SSE configuration. The SnipIts are stored temporarily in machine memory (RAM). This information includes location and order details of the SnipIts as a part of the whole word or value. These formatted SnipIts are then encrypted in machine memory (RAM).

A sample API POST to create SSE data can look like this:
[{"RefId":"        ","RowId":"ce8eb7e5-6dea-4c3b-90a3-4ba6edd350bb",    "Fields":[{"Name":"FirstName",
"Value":"Darth"},{"Name":"LastName","Value":"Vader")},{"Name":"DOB","Value":"1/1/1940")},
{"Name":"SSN","Value":"123231234"},   {"Name":"Email","Value":"dvader@xyz.com"}]},
[{"RefId":1,"RowId":"9d41a0cd-9774-4420-b750-c56c305e009d",    "Fields"}:[{"Name":"FirstName",
"Value":"Luke"),{"Name":"LastName","Value":"Skywalker"},    {"Name":"DOB","Value":"2/1/1960},
{"Name":"SSN","Value":"981-23-4567"},   {"Name":"Email","Value":"Iskywalker@xyz.com"}]}]
In this example the "Row Id" is the source database token identifying the row to return and all the values can be processed into the tenant keyword and index tables described above.

At 602, the SnipIt is then processed by the SSE encryption program at 603, producing an encrypted value saved in the SSE Tenant Keyword Index Table; Search String field. Simultaneously, the operations at 603 trigger the Tenant Index Table entries referenced in FIG. 6A, 610. The process at 603 can support more than one unique key vault for the encryption function. The SSE Encryption 603 receives a plain-text SnipIt string starting the process of adding the SSE Mask to the plain-text value and then encrypting the combined value according to the SSE Key Vault(s) used.

The SSE Mask provides two algorithms, with the first Mask algorithm designed to reduce the ability to crack the encrypted value with database analytics to produce database. These values are inserted into the Tenant Keyword Table: Search String 604; from RAM to Disk.

The second SSE Mask algorithm defines the SnipIts' relationship with other SnipIts. At 605, the encrypted values produced by 603 are inserted into the Tenant Keyword Table: SSE Index.

The record creation process shown can be repeated at intervals as needed to rebuild, extend, or otherwise improve an index. If a record is deleted from the database, for example, there may be difficulties identifying entries in keyword tables that should also be deleted since the keyword tables may be non-deterministically or irreversibly formed and the tenant keyword table and tenant index table may represent a one-to-many relationship. Thus, in some situations the appropriate way to "clean out" deleted records from the encrypted search tables involves reusing the creation process (partially or fully).

Figure 6A:
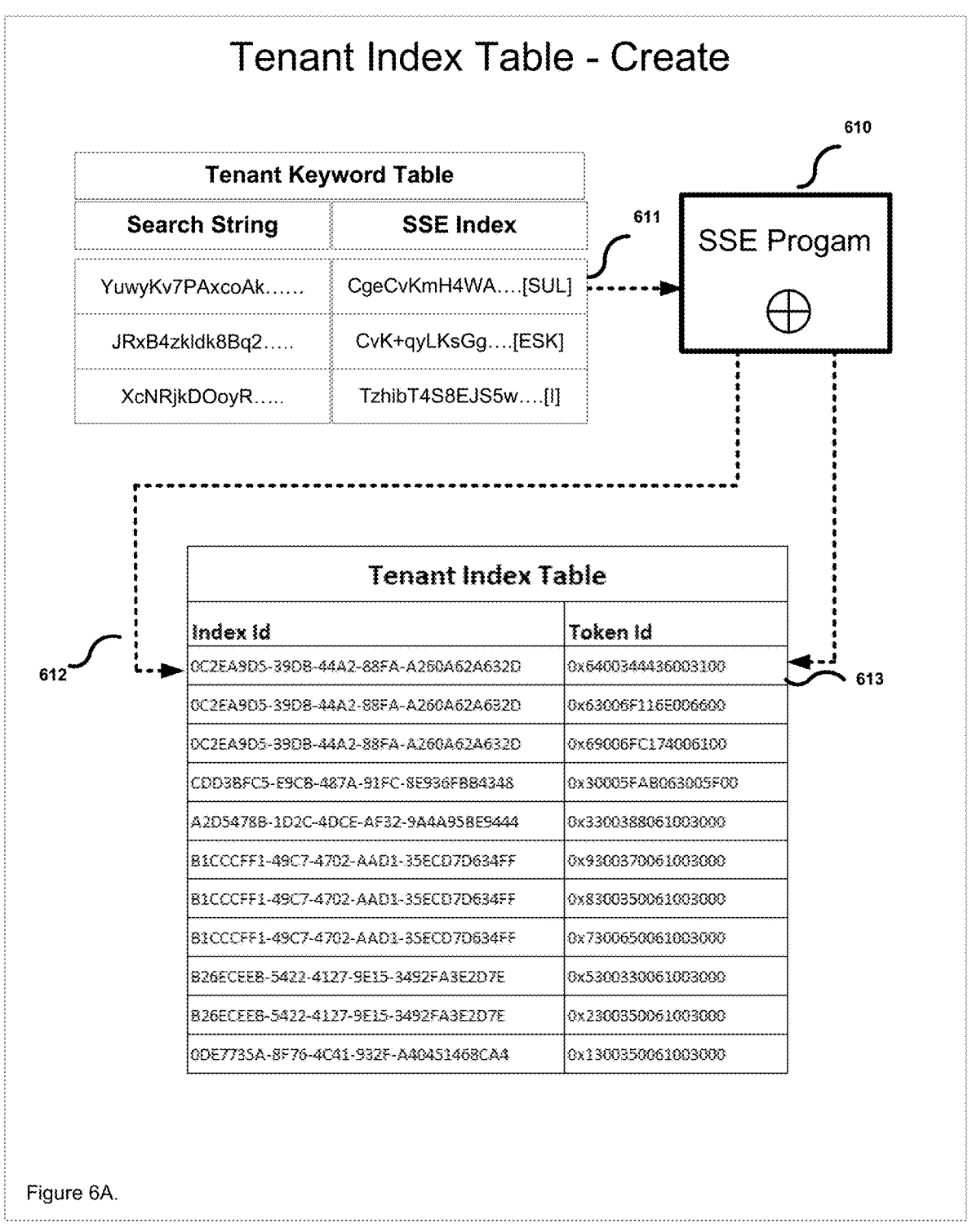
FIG. 6A is a flow of creating values in the Tenant Index Table.

In FIG. 6A, the SSE Program at 610 triggered by 603 as shown in FIG. 6, pulls the SSE Index 611 first-generation encrypted Search String. The first-generation encrypted value is stored in the Tenant Index Table: Index ID 612. The second-generation encrypted Search String is stored in the Tenant Keyword Table: SSE Index.

The Token Table: Row ID is encrypted and stored in the Tenant Index Table Token ID 613. The Token ID connects SSE to Shredded Data Storage and Transparent Data Encryption (TDE) storage schemes (e.g., TDE full encryption, TDE row encryption and TDE column encryption) with the decrypted Token data returned to the application.

In some implementations, a Shredded Data Storage or other storage layer hosts multiple tenants, clients, or customers. In such cases, one or more Tenant Keyword Tables and Tenant Index Tables can be generated separately for specific tenants, clients, or customers. These tables can ultimately refer to Tokens or Row IDs that are found in a shared SDS or other storage layer. In one nonlimiting example, two different corporate entities can be considered different customers and separate Tenant Keyword and Tenant Index tables can be generated for them and their users. In an extension of this example, the two corporate entities are part of a consolidated holding company and additional Tenant Keyword Table and Tenant Index Table can be generated based on the data used by both corporate entities and accessible by certain users who are associated with the holding company. In this way, different groups of users can be given different search access levels even at this early stage of the process that does not access any piece of the ultimate data.

Figure 6B:
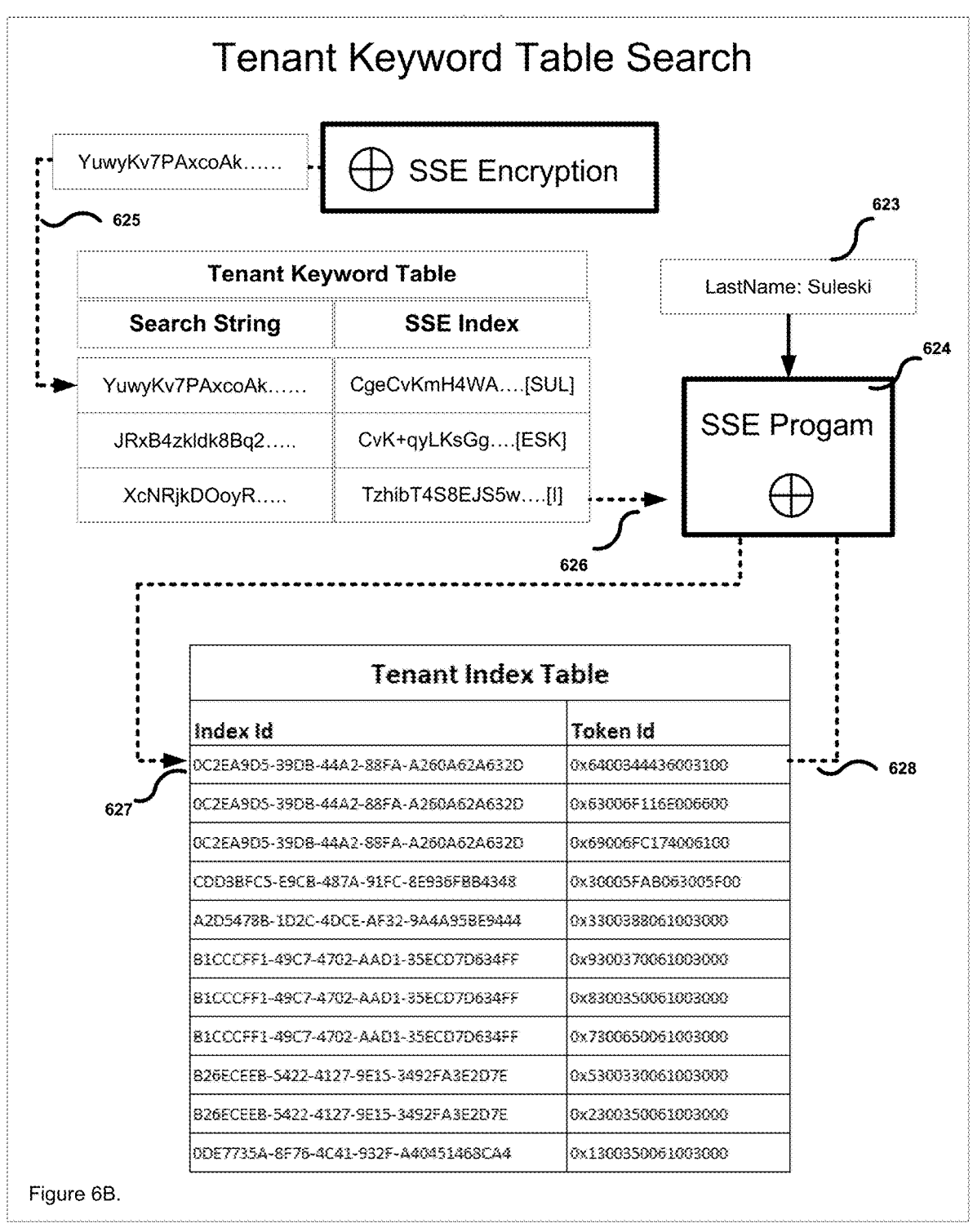
FIG. 6B demonstrates how plaintext searches are processed.

By way of illustration, FIG. 6B shows an exact match for the last name "SULESKI" 623. The SSE Program at 624 receiving the search variable starts the SSE Encryption 603 process resulting in an encrypted value used to search the Tenant Keyword Index Table: Search String column 625. The SSE Program process as shown and described in FIG. 7 determines at 626, the Tenant Keyword Index Table: SSE Index to decrypt and match to the Tenant Index Table: Index ID value 627. Tenant Index Table: Token ID 628 is returned to the SSE Program 624 where it is decrypted producing the source database token representing the data to return to the user or application.

Figure 6C:
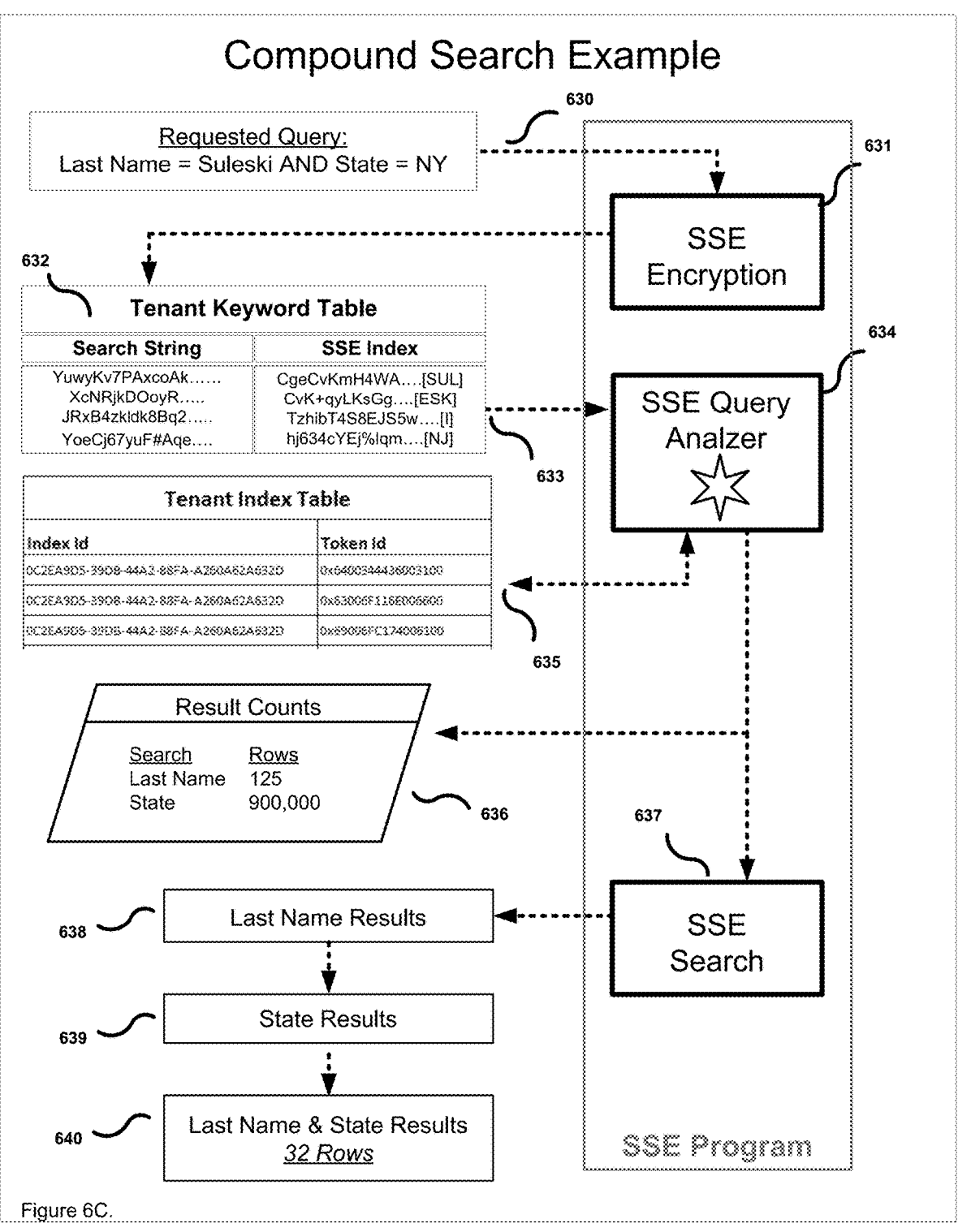
FIG. 6C is an example of SSE Query Analyzer compound searching with "ANDs & ORs".

By way of illustration, FIG. 6C shows an embodiment of compound searching encrypted data for performance. The example starts with an SSE API search query request 630 for people last names of "Suleski" who live in "New York" (NY) state. SSE Query Analyzer 634 determines which of the two fields have less to search creating a Parent/Child relationship. Taking the smallest number of rows to search will take the shortest amount of time. Then taking the return set of data and search by the second smallest number of rows. FIG. 6C shows a result of analyzing with 900,000 NY state values and 125 Suleski last names in the SSE Database. Searching for last name Suleski, returns 125 rows which are then searched for the state of NY and returns 32 rows.

The process begins with SSE Encryption 631 preforming a compound search method when inbound queries use "AND" & "OR" in their SSE API request. The searches, as previously described, can be performed without ever decrypting any records or even accessing the database tables that contain the stored records, such as personal information.

At 632, SSE Encryption process executes (i.e., FIG. 6, FIG. 6A, FIG. 6B) with a single cycle to produce one decrypted SSE Index value.

At 633, the SSE Query Analyzer receives the decrypted SSE Index value and searches the Tenant Index Table: Index Id 635 for just the total row count. Each search row count is stored in computer memory associated with the search term 636.

The SSE Query Analyzer 634 then executes an SSE Search 637 using the search value with the smallest row count. In this example, "Suleski" has 125 rows and is searched first at 638.

The SSE Query Analyzer 634 then executes a second SSE Search 637 using the Last Name search results 638 as the in-RAM record set for state equal to "NY" 639. This result set represents the query results return of 32 rows 640.

The process listed above is one potential choice or embodiment of the Query Analyzer 634. In some embodiments, the query analyzer can decide that two or more of the search values will likely result in an acceptably low row count and can execute both searches in parallel. The Query Analyzer 634 can then receive an output that provides, for example, a collection of RowID values for the results of both searches and can then choose the intersection of the two collections (in the example of an AND search) as the correct search output.

Continuing the example of parallel processing, if the search is instead an OR search, the Query analyzer can return the union of the returned collections. In a similar manner, the difference of the two collections can be used if the search was an "AND NOT" search.

In all search examples provided, the number of terms and specific results are meant to be nonlimiting examples. The same system and algorithms can be used for larger or smaller numbers of search terms, for example.

In some cases, searching or lookup processing can take undesirable amounts of time, for example in the case of searches with a large number of results. In some examples, the SSE program begins generating results to a buffer and can use this buffer to begin displaying results to a user. In a specific nonlimiting example, the program uses such a buffer to display "results 1-20" to a user through a user interface while the system is still computing additional results. The additional results can be added to the buffer or otherwise consolidated such that the system has an overall set of results when the computations are completed. In some cases, such partial results can include some sort of token to allow the user or an application to get more results from the same search.

Figure 7:
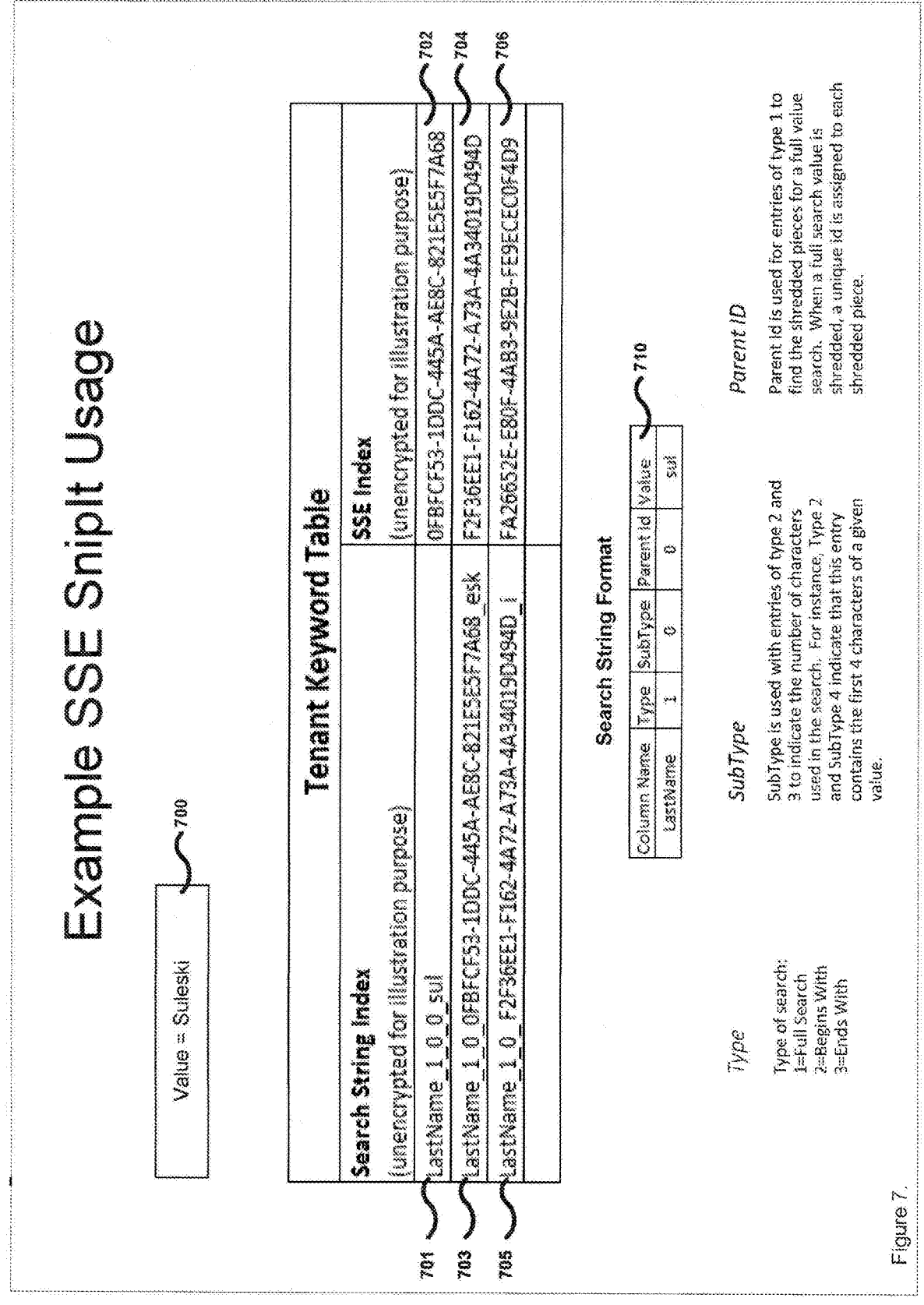
FIG. 7 is an example of an SSE SnipIt Usage.

Tenant Keyword Table assembly as shown in FIG. 7, starts with an input value: last name SULESKI at 700. The SSE Program processes multiple algorithms creating the encrypted values used for insertions, searching, and updating.

Shredding algorithms breaks the value SULESKI into three parts or SnipIts; SUL_ESK_I.

SSE Program assembles a formatted string 710 which is encrypted and stored in the Search String Index column 701. Then, the Search String Index value is twice encrypted and stored in the SSE Index column 702.

Search String format 710 defines a compound query containing multiple elements. The column name is defined for the given tenant's table. Type indicates the type of search that the entry is for (e.g., 1=Full Search, 2=Begins With, 3=Ends With, 4=Compound). SubType is used with entries of type 2 and 3 to indicate the number of characters used in the search. For instance, Type 2 and SubType 4 indicate that this entry contains the first 4 characters of a given value. The compound query is then encrypted by the appropriate Key Vault and inserted into the Tenant Keyword Table-search string index.

In 703, the Parent ID will use the SSE Index 702 related to the last name. Then, the Search String Index value can be twice encrypted and stored in the SSE Index column 704.

In 705, the Parent ID will use the SSE Index 704 related to the last name. Then, the Search String Index value can be twice encrypted and stored in the SSE Index column 706.

The last SSE Index 706 value is decrypted once resulting in the first-generation encrypted value. This encrypted value can be used to search the Tenant Index Table: Index ID for a match. This encrypted value can in some embodiments be a RowID or other link to a next step of data retrieval.

The example use of ParentID and various Typing information illustrated above allows the search process to search for different strings starting with "Sul" but having different following letters (e.g. "esk" or "ami") without ever associating those chains of letters together and thus preventing brute force attacks of various types. In some cases, a search matches some portions (e.g. "Sul" and "esk") but not another portion—in which case the SSE index 706 containing a reference to further tables will never be reached so no match is generated. This is done without revealing what other entries may share some traits with the non-matching search.

It should be emphasized that FIG. 7 is shown unencrypted so that the disclosure can be understood. In practice, the values can be encrypted, salted, hashed, or otherwise obscured using any combination of those and other methods known to one skilled in the art. Some of the records, in some embodiments, are obscured in non-reversible and/or non-deterministic fashion as the algorithms presented here may never need to retrieve the original content that generates entries in the Tenant Keyword Table.

This operation creates a "one to many" relationship between the Tenant Keyword Index Table/SSE Index and the Tenant Index Table/Index ID as demonstrated in FIG. 8.

SSE Partial Searching as shown in FIG. 8, processes "begins with" and "end with" searching. In this example, the search is to find everyone whose last name begins with "SUL". SSE pre-configuration indexed a search for the first three characters in the last name and stored them in the SSE tables. In 800, the algorithm constructs the compound string for "SUL", encrypts and searches the Search String Index column for a match. This match then decrypts the second-generation value 801 stored in the SSE Index column.

In 801, the first-generation SSE Index value is used by the SSE Program 802 to search the Tenant SSE Index Table: Index ID column 803 for all matches, 3 rows in this example. Many Index IDs 803 associated with unique SSE Row ID 804 are then processed by the SSE Program 805 to decrypt the SSE Row Id 804 to reveal the Token for data retrieval. Data retrieve would then show results (e.g., Suleski, Sully, Sullivan).

The encrypted searching as described herein allows for searching data while in an encrypted state and maintains sub-second (less than a second) performances or returns on searches. In some embodiments, search results are returned within milliseconds. In some embodiments, some searches can be returned within 38 milliseconds, such as when searching a four million row data base with 12,000 SSN (social security numbers) search results.

Figure 9:
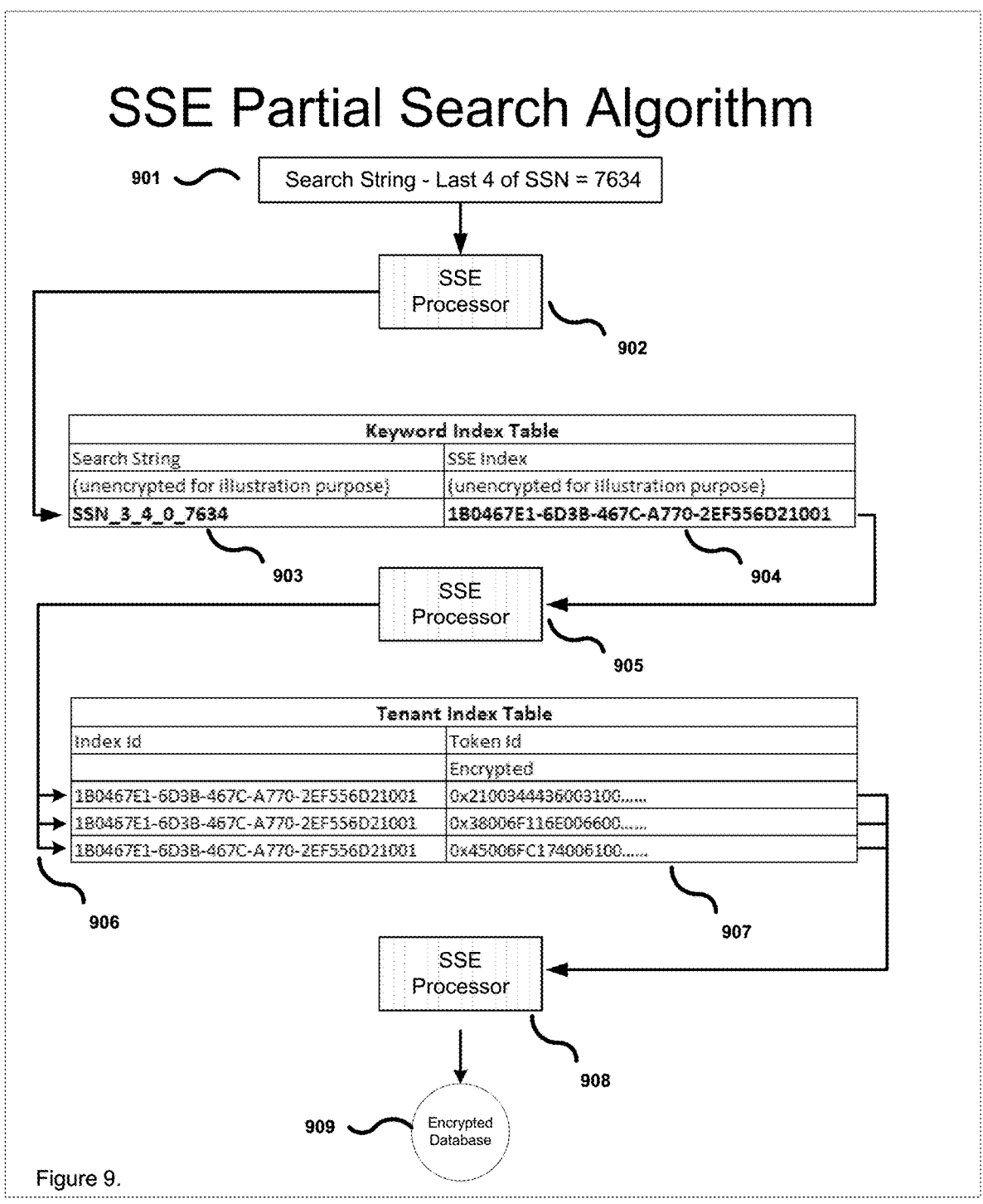
FIG. 9 is an example of an SSE partial search algorithm searching for the last four digits of a number.

FIG. 9 illustrates computational database operations conducting partial searches (e.g., first three letters of the first name, last four numbers of the SSN). These types of searches may return more than one row.

As an example, a search for the value 'Sul' can return one or more results (e.g., "Suleski, Sulston, Sully, and the like). A search for the last four values of an SSN can return one or more results (e.g., 234-55-1234, 765-89-1234, 436-76-1234). Each partial search result does correspond to a unique encrypted Tenant Index Table: Token Id value.

The search begins when the SSE API POST a query 901. The SSE processor 902 creates a compound query based on the search string format (See FIG. 7 at 710) with the column name, type, sub type, parent Id, and value. The compound query 903 is then encrypted by the appropriate key vault in CPU memory. SSE processor 902 takes the Search String value 903 and encrypts once 904 as the SSE Index value. The SSE Processor 905 takes the first-generation encrypted value to search Tenant Index Table: Index Id for a list of results 906. The corresponding Token ID 907 is decrypted by the SSE Program 908 with the resulting matches from the encrypted database 909. In this way, there can be more resulting matches retrieved from the encrypted database than were matched in the Keyword Index Table as the Token ID can be associated with multiple records. This can all be achieved without ever decrypting any data or storing it in any reversible fashion using the techniques presented above.

Figure 11A:
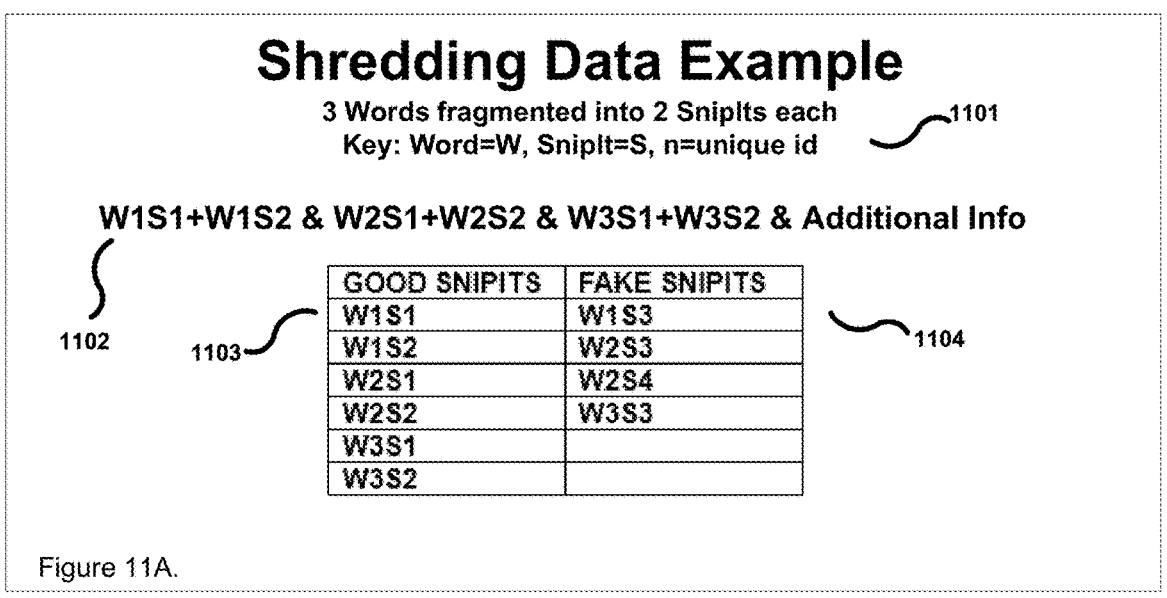
FIG. 11A is an example of typical shredding and assembly of SnipIts.

The SDS shredding process fragments data values (e.g., words, numbers, formula) called SnipIts into different sizes based on preconfigured parameters and then arranges them so that they can be reassembled. In FIG. 11A, an example of shredding 1101 shows three words, with word length being randomly fragmented into two halves creating six SnipIts. These six SnipIts 1102 are arranged in order and joined with plus signs (+) and separated by the and signs (&) providing context. This method is simple and if decrypted would reveal its contents. To increase entropy, the SnipIts are randomized with original SnipIts (Good SnipIt) 1103 plus a small percentage of false SnipIts (Fake SnipIt) 1104 from the existing stored SnipIt.

Figure 11B:
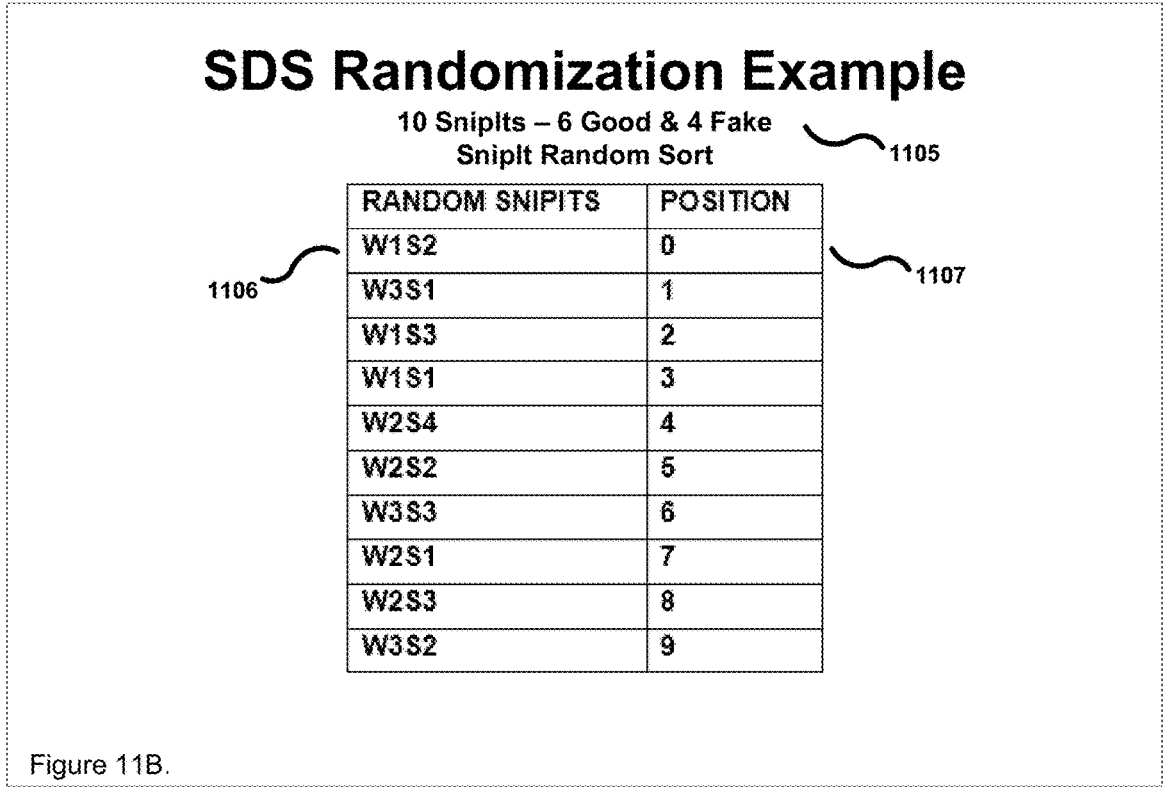
FIG. 11B is an example of randomization of good and fake SnipIts.

The process then combines both list (Good+Fake) into one list 1105 as shown in FIG. 11B. Once combined the new list 1105 is randomly sorted. Next the process identifies the SnipIts 1106 by assigning a sequence of numbers (0-9) 1107 to numerically represent its position for the next process.

In FIG. 11C, the selection of good SnipIts (in grey) 1108 represent good SnipIts to use and in what order to use them. In this example, SnipIts for the first value would be W1S1 combined with W1S2, this produces Position 3 & 0 for "30". To mark the end of values we add a period (.) changing the string to "30." Processing the example 1109 to its end produces "30.75.19"; this value is called the R-String.

The final step is to store the R-String in the Context Table. All the SnipIts (Good+Fake) are used with the R-String and additional information for storing 1110. In this example using position 1108 numbers, a single digit constraint is used for illustration purposes. The position digits 1108 can be expanded into four (or more) digit range (e.g., 0001-9999). A reserved range of four-digit numbers may be used as process instructions (0001-0099) leaving a SnipIts position range of (0100-9999). For example, process instruction 0030 or a range (0030-0040) could mark the end of value instead of the period. In addition, these number ranges could be assigned randomly.

The R-String by itself is not secure so in some cases the system may encrypt or apply an algorithm to obscure the real value. The approach applied will need to be reversible for returning SDS to original data or content.

The method of securely processing data as described herein, is implemented on a computer platform. The computer platform includes a processor, connected or coupled to a memory. The processor is configured logic circuitry, and/or physical circuits that respond to and execute instructions. The memory is a tangible storage medium that is readable by the processor. The memory can comprise random access memory (RAM), a hard drive, a read only memory (ROM), or any combination thereof. The memory can have instructions for controlling the processor to perform the operations necessary to securely process the data as disclosed herein.

The computer platform can further include chipsets, controllers, wireless communication devices, peripherals, interfaces, input/output (I/O) components, displays, power supplies and the like. The computer platform can be implemented as a single device, or in a distributed manner, or on a network of computers, and can use a distributed system architecture, e.g., a master-slave architecture, a client-server architecture, and the like. The computer platform can be implemented as a mobile device, a smart phone, and a personal computer. These examples are not limiting.

Some embodiments can be described using the expression "one embodiment" or "an embodiment" or "an example" along with their derivatives. These terms mean that a particular feature, structure, or characteristic described in connection with the embodiment or example is included in at least one embodiment. The appearances of the phrase "an embodiment" or "an example" in various places in the specification are not necessarily all referring to the same embodiment or example.

The embodiments and/or examples described herein are exemplary and should not be construed as implying any specific limitation on the present disclosure. It should be understood that various alternatives, combinations and modifications of the present disclosure could be devised. The present disclosure is intended to embrace all such alternatives, modifications and variances that fall within the scope of the appended claims.

What is claimed is:

1. A method for securely searching encrypted data using compound searching, comprising the steps of:
   processing with an SSE query analyzer comprising "AND", "OR", and nested queries;
   receiving an SSE API search request that contains multiple data components;
   using SSE encryption to detect a compound query syntax that triggers the SSE query analyzer;
   separating a plurality of search data components into a first data value and at least a second data value;
   processing the first data value;

wherein the SSE query analyzer processes SSE encryption steps once on the first data value;
   wherein the SSE query analyzer decrypts an SSE index value of a tenant keyword table once revealing a first encrypted generation;
   using the SSE index value to search the index ID of a tenant index table for a match;
   using the SSE query analyzer to process accumulated row counts stored in temporary machine memory;
   using the SSE query analyzer to process the SSE encryption steps once on the second data value;
   using the SSE query analyzer to decrypt the SSE index value of the tenant keyword table once, revealing the first encrypted generation;
   using the SSE index value used to search the index ID of the tenant index table for a match;
   wherein the SSE query analyzer processes the accumulated row counts stored in temporary machine memory;
   wherein the SSE query analyzer processes the accumulated row counts stored in temporary machine memory;
   using the SSE query analyzer to sort the accumulated row counts and selecting the smallest number of accumulated row counts;
   wherein the SSE query analyzer triggers the SSE encryption to process a first selected search data value and store its encrypted results in a first RAM temporary database;
   using the SSE query analyzer to sort the accumulated row counts and selecting the second smallest number of accumulated row counts;
   wherein the SSE Query Analyzer triggers the SSE encryption to process the second selected search data value using the first RAM temporary database to search and store its encrypted results in a second RAM temporary database; and
   wherein the second RAM temporary database containing the index ID of the tenant index table is processed by the SSE encryption to decrypt the token ID of the tenant index table.

2. The method of claim 1, further comprising:
   using random forest and machine learning to predict the accumulated row count selection.

3. The method of claim 1, further comprising:
   receiving an SSE API search request that contains multiple data components; wherein SSE encryption detects the compound query syntax for an "OR" operation;
   wherein SSE encryption processes each data component and stores results in one "n" RAM temporary database.

* * * * *